US012783803B1

(12) United States Patent

Dingliwal et al.

(10) Patent No.: US 12,783,803 B1

(45) Date of Patent: Nov. 3, 2026

(54) SPECULATIVE DECODING TECHNIQUES FOR GENERATIVE MODELS

(71) Applicant: Amazon Technologies, Inc., Seattle, WA (US)

(72) Inventors: Saket Dingliwal, Seattle, WA (US); Sravan Babu Bodapati, Fremont, CA (US); Shubham Katiyar, Bothell, WA (US); Spurthideepika Sandiri, Holliston, MA (US); Venkata Siva Sai Krishna Balakavi, Jersey City, NJ (US); Melanie C B Gens, Honolulu, HI (US); Samuel Tucker, Minneapolis, MN (US)

(73) Assignee: Amazon Technologies, Inc., Seattle, WA (US)

( * ) Notice: Subject to any disclaimer, the term of this patent is extended or adjusted under 35 U.S.C. 154(b) by 127 days.

(21) Appl. No.: 18/976,923

(22) Filed: Dec. 11, 2024

(51) Int. Cl.

| | |
|---|---|
| ***G06N 20/10*** | (2019.01) |
| ***G06F 40/284*** | (2020.01) |
| ***G06F 40/30*** | (2020.01) |

(52) U.S. Cl.

CPC ............ *G06F 40/284* (2020.01); *G06F 40/30* (2020.01)

(58) Field of Classification Search

None

See application file for complete search history.

(56) References Cited

U.S. PATENT DOCUMENTS

2023/0135179 A1* 5/2023 Mielke .................. G06N 5/022 704/232

OTHER PUBLICATIONS

Shenoy, et al., "A guide to LLM inference and performance", Baseten Blog, https://www.baseten.co/blog/llm-transformer-inference-guide/.

Leviathan, et al., "Fast Inference from Transformers via Speculative Decoding", In International Conference on Machine Learning, pp. 19274-19286. PMLR, 2023.

Miao, et al., "SpecInfer: Accelerating Large Language Model Serving with Tree-based Speculative Inference and Verification", In Proceedings of the 29th ACM International Conference on Architectural Support for Programming Languages and Operating Systems, vol. 3, pp. 932-949. 2024.

(Continued)

*Primary Examiner* — Jakieda R Jackson

(74) *Attorney, Agent, or Firm* — Pierce Atwood LLP

(57) ABSTRACT

Techniques for improving speculative decoding for improved compute utilization are described. A system may determine a compute budget representing a maximum number of speculative tokens to be verified based on hardware properties, a batch size and an input length. Compute budgets for varying batch sizes and input lengths may be determined offline. At inference time, the compute budget corresponding to a runtime batch size and runtime input lengths may be used to determine the maximum number of tokens that can be verified by a generative model while maintaining efficient compute utilization. The compute budget may be allocated/distributed among the inputs of the batch to efficiently process the inputs in parallel. The allocated budget may be updated for subsequent timesteps. The compute budget may represent the maximum number of tokens that can be verified without the system processing becoming a compute-bound scenario.

20 Claims, 9 Drawing Sheets

(56) References Cited

OTHER PUBLICATIONS

Li, et al., "EAGLE: Speculative Sampling Requires Rethinking Feature Uncertainty", arXiv preprint arXiv:2401.15077 (2024).
Chen, et al., "SEQUOIA: Scalable, Robust, and Hardware-aware Speculative Decoding", arXiv preprint arXiv:2402.12374 (2024).
Li, et al., "EAGLE-2: Faster Inference of Language Models with Dynamic Draft Trees", arXiv preprint arXiv:2406.16858 (2024).

* cited by examiner

SPECULATIVE DECODING TECHNIQUES FOR GENERATIVE MODELS

BACKGROUND

Natural language processing systems have progressed to the point where humans can interact with computing devices using their voices and natural language textual input. Such systems employ computing techniques to identify words spoken and written by a human user based on the various qualities of received input data. Speech recognition combined with natural language understanding processing techniques enable speech-based user control of computing devices to perform tasks based on the user's spoken or other natural language inputs. Such processing may be used by computers, hand-held devices, telephone computer systems, kiosks, and a wide variety of other devices to improve human-computer interactions.

DETAILED DESCRIPTION

Figure 1:
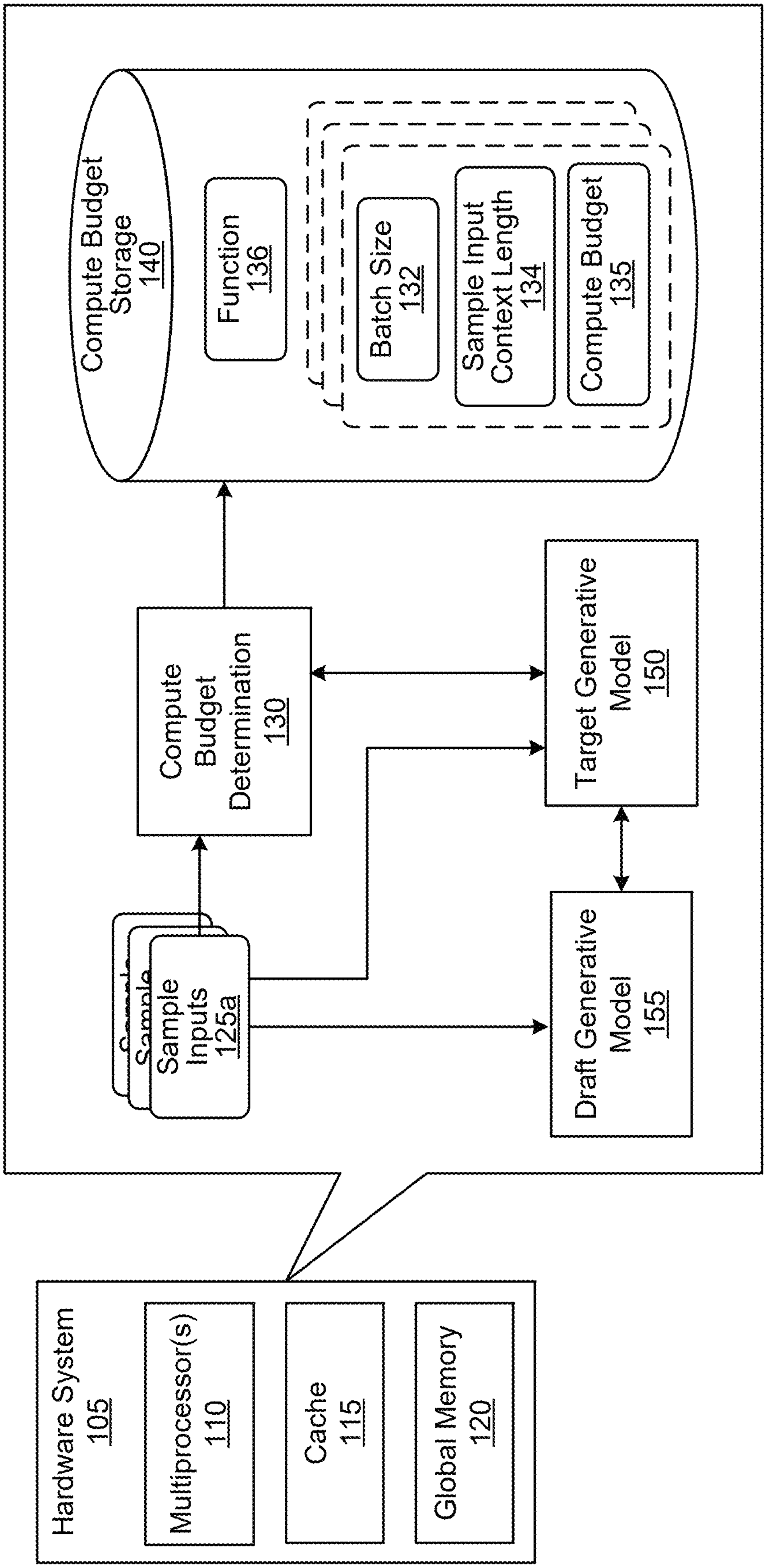
FIG. 1 is a conceptual diagram illustrating example components and processing used to determine compute budgets for a hardware system, various batch sizes and various input context lengths, according to embodiments of the present disclosure.

Natural language processing (NLP) is a field of computer science, artificial intelligence, and linguistics concerned with processing a user command input in the form of a natural human language (e.g., English, Chinese, etc.). Such a natural language command may come in the form of audio, text, image, or other format. Natural language processing may involve a number of different specific processing techniques such as those discussed below. Automatic speech recognition (ASR) is a field of computer science, artificial intelligence, and linguistics concerned with transforming audio data associated with speech into a textual or other token representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system, and a single component can be used to input audio and output a natural language understanding of any speech in the audio. Synthesized speech generation (SSG) (including text-to-speech (TTS)) is a field of computer science concerning transforming textual and/or other data into audio data that is synthesized to resemble human speech. Natural language generation (NLG) is a field of artificial intelligence concerned with automatically transforming data into natural language (e.g., English) content. Speech-to-speech (S2S) is a field of computer science, artificial intelligence, and linguistics in which embedding data is generated to represent speech in audio data and, using one or more models, the embedding data is processed to generate audio data and/or a system command (such as an application programming interface (API) call) responsive to the speech. Language modeling (LM) is the use of various statistical and probabilistic techniques to determine the probability of a given sequence of words occurring in a sentence. LM can be used to perform various tasks including understanding a natural language input and performing generative tasks that involve generating natural language output data.

An artificial intelligence (AI) system may use ASR, NLU, NLG, and/or TTS, each with and/or without its own and/or a shared language model, for processing user inputs, including natural language inputs (e.g., typed, displayed, and spoken inputs) and other type of inputs (e.g., inputs not received from a user, inputs received from a system component, inputs representing occurrence of events, etc.).

The AI system may use other types of generative models including a model that processes audio/speech as an input and outputs audio/synthesized speech (a speech-to-speech model). Another example generative model that may be used is a multi-modal model that processes two or more types of data (e.g., audio, text and/or image) as inputs and/or outputs two or more types of data (e.g., audio, text and/or image).

Certain systems may be configured to respond to natural language (e.g., spoken or typed) user inputs. For example, in response to the user input "what is today's weather," the system may output weather information for the user's geographic location. As another example, in response to the user input "what are today's top stories," the system may output one or more news stories. For further example, in response to the user input "tell me a joke," the system may output a joke to the user.

A system may receive a user input as speech. For example, a user may speak an input to a device. The device may send audio data, representing the spoken input, to the system. The system may perform ASR processing on the audio data to generate ASR data (e.g., text data, token data, etc.) representing the user input. The system may perform processing on the ASR data to determine an action responsive to the user input. A system may also receive a natural language user input in the form of text, such as a text input from a computer, phone, or other device. Alternatively, or in addition, the device itself may perform all or a portion of such processing.

In some instances, the system may be configured to process input text data (such as ASR data or text entered into a user interface or extracted from an image using optical character recognition) using one or more language models (e.g., one or more large language models (LLMs)) to determine a response to the user input. For example, in response to a user input of "what is the history of the United States," the language model(s) may output a synopsis of the history of the United States of America.

In some such instances, the processing of the language model to generate the response may take some time and result in user-perceived latency. User-perceived latency may refer to the time elapsed between the user providing an input and the user receiving a system response. For example, the language model may perform autoregressive decoding to generate the response, where a single (or few) tokens of the response are generated at each time step of the decoding process. At a time step, the autoregressive decoding of the language model may include processing the user input and the output of the previous time steps to generate an attention-based representation, and using the representation to generate a probability distribution over a vocabulary of the language model, where the probability distribution represents likelihoods of each token in the vocabulary as the next token to be output at the time step. As such, the processing by the language model may take some time and may result in some noticeable user-perceived latency.

In some instances, efficiency of the language model's processing may be improved using speculative decoding techniques, where multiple speculative tokens, potentially representing a response to an input, are verified by the language model during a single time step. The verification process performed by the language model can be more efficient (e.g., in terms of computational resources, time, etc.) than the generation process performed by the language model. Further, the generation of the speculative tokens can be more efficient (e.g., in terms of computation resources, time, etc.) than the generation process performed by the language model using a probability distribution over the entire vocabulary. As such, speculative decoding can be used to improve latency of the language model generating a response to an input. Using speculative decoding, a system can generate multiple tokens of the response in a single timestep/iteration, rather than generating a single token in a single timestep when speculative decoding is not used.

A system performing speculative decoding may include a target (or main) generative model and a draft (or speculating) model. The draft model may be a smaller generative model as compared to the target generative model. The draft model may process an input and may generate, during a timestep, speculative (or draft) tokens representing a potential response to the input. During a another timestep, the target model may process the speculative tokens and may verify that the speculative tokens represent a response (e.g., an accurate response) to the input. During this timestep, the target model may accept or reject the speculative tokens; if the speculative tokens are rejected, then the target model may generate a token(s) of the response. At the next timestep, the draft model may generate the next speculative tokens of the response, where the next speculative tokens may be based on the prior speculative tokens when they are accepted by the target model; when the speculative tokens are rejected the next speculative tokens may be based on the token(s) generated by the target model.

As used herein, with respect to speculative decoding, generation or decoding steps refer to processing by the target generative model to generate a token(s) for a timestep. As used herein, verification or verifying steps refer to processing by the target generative model to verify the speculative tokens generated by the draft model.

Language model inference on graphics processing units (GPUs) is often memory-bound, with significant time spent fetching model parameters, leading to underutilized compute resources. Speculative decoding techniques can address this issue by leveraging available compute cycles during memory-bound phases. As described above, speculative decoding can employ a draft model to determine speculative tokens in parallel with the target generative model (that performs core inferencing). While the target generative model fetches parameters, the draft model can generate potential next tokens, which may be represented using a tree structure (referred to as a draft token tree) including multiple potential token sequences for the response with varying confidence scores. These speculative tokens are then verified by the target generative model, enabling parallel execution and faster inference. The speedup achieved by speculative decoding can depend on the shape and size of the draft token tree in some cases, which can also determine the degree of parallelism and compute utilization.

Speculative decoding techniques typically use fixed-size draft token trees limiting a number of tokens verified by the target model in a timestep. Such fixed sizing can fail to adapt to varying hardware operational properties, different batch sizes and/or sample complexities, leading to suboptimal compute utilization. Available compute cycles during memory-bound phases depend on hardware properties and batch size, with larger batch sizes leaving less compute resources for parallel verification.

The present disclosure describes, among other things, techniques for performing speculative decoding using adaptive sizing for draft token trees and a "compute budget" for a number of tokens to be verified by the target model in a timestep. In some cases, the draft token tree size may be limited to the compute budget, which represents the number of speculative tokens that the target model verifies during a timestep. In other cases, the draft token tree size may be larger than the compute budget but the number of tokens provided to the target model for verification is limited to the compute budget. A system of the present disclosure determines the compute budget based on hardware properties, batch-size and/or input context. Hardware properties may include performance metrics of a processor(s) used to perform generative model inferencing and speculative decoding. In some embodiments, the hardware properties include hardware operational intensity represented by ops:byte ratio known in the art. The batch size includes a number of inputs being processed in parallel by the system using the particular hardware. The input context may include, among other things, complexity of the input. For comparatively simple inputs, larger draft token trees may be used, while smaller trees may be used for relatively complex inputs. In some embodiments, input complexity may be determined The input context may also or instead include input length (number of tokens in the input).

Using adaptive sizing that depends on hardware properties, batch size and/or input context, the techniques of the present disclosure efficiently use available compute resources for performing speculative decoding for generative models resulting in latency and resource usage improvements.

Such use of adaptive sizing can avoid wasting cycles on inaccurate speculative tokens. If too many tokens are speculated but few tokens are being accepted, then that can affect efficiency as the target model would be performing more decoding steps than verifying steps. If too few tokens are speculated and all or most of them are being accepted, then efficiency could have been improved by speculating more tokens. The number of tokens to be verified efficiently may also be hardware constrained. If the hardware can handle more computations, then efficiency can be improved by speculating more tokens. If the hardware is comparatively faster, then efficiency can be improved by speculating more tokens. Often systems run inference for multiple inputs in parallel (e.g., for a batch of inputs) offering some level of parallelization in addition to speculative decoding, and if the system is at full capacity (e.g., due to a large number of inputs received for processing) then there may be many tokens to process in parallel already and additional parallelism from decoding and verifying tokens may not be beneficial. In some such cases, speculative decoding may be “dialed down” by performing less speculating/verifying steps and more generation steps. On the other hand, if the batch size is small, then speculative decoding may be “dialed up” by performing more verifying steps and less generation steps.

The techniques of using adaptive sizing may involve a two-step approach. In the first step, the system learns a function to define a “compute budget” based on a particular hardware’s properties and a given batch size, where the compute budget represents a number of tokens the target model can verify efficiently. In the second step, the system uses the learned function to determine the compute budget dynamically based on the input context.

Based on the hardware properties, inference processing can be compute-bound at some point and can be memory-bound at other points. Memory-bound processing relates to when the system is waiting for data (e.g., model parameters, generated tokens, etc.) to be transferred/retrieved from the system memory. Memory-bound scenarios may depend on the data-transfer throughput of the memory system and may be a limiting factor in cases where larger amounts of data need to be copied over to working memory or written to the system memory. Compute-bound processing relates to the number of computations needed to complete a step/task. Compute-bound scenarios may depend on the computational throughput of the processor(s) of the system and may be a limiting factor in cases where many operations are to be performed on a piece of data.

In some embodiments, the first step may be performed as offline operations prior to using speculative decoding and a generative model for processing a runtime input. One way to understand memory-transfer and compute trade-off in generative model inference is to use and analyze a ratio of time taken for verifying X tokens to time taken for a single decoding step of the generative model. This ratio is close to one (1) when the processing is memory-bound but the ratio increases linearly with X when the processing is compute-bound. The value of X at this transition can depend on the hardware operational intensity, batch size and input context lengths. In some embodiments, the function to define the compute budget includes determining the maximum value of X beyond which the verification-to-decoding time ratio deviates from one (1), indicating a compute-bound scenario. The function may be learned as part of offline operations by measuring verification and decoding times, using a particular hardware of interest, for various batch sizes, context lengths and X values. The learned functions may be stored. During inference/runtime, the system may retrieve the learned function corresponding to the particular batch size and context length, and may use the retrieved function to determine the compute budget (draft token tree size) that can be allocated without the processing becoming compute-bound.

In some embodiments, the second step may be performed during runtime/inference operations. A current batch size and the input context length (e.g., the number of tokens in the input) for each input/sample being processed are known at inference time. The compute budget for a particular input is based on the batch size and the input context length. The system may use the appropriate learned function with the current batch size and the current input context length to determine the compute budget for the current input. The system may be configured to distribute the compute budget among the samples within the batch based on the samples’ complexities. In some embodiments, the system may determine a sample’s complexity based on the draft model’s confidence in generating the draft tokens for the sample. In some embodiments, the system may be configured to allocate a larger portion of the compute budget to a sample associated with higher draft model confidence and a smaller portion of the compute budget to a sample associated with lower draft model confidence. As such, samples where the draft model confidence is high, the draft token trees may be larger and thus more tokens may be verified at a single step; and samples where the draft model confidence is low, the draft token trees may be smaller and thus fewer tokens may be verified at a single step. Such adaptive or dynamic allocation of the compute budget can optimize the verification of the maximum number of tokens by efficiently leveraging the available compute resources.

The number of tokens to be verified may be determined/updated for every timestep based on, for example, the input complexity, which may be measured using the system’s confidence level in performing speculative decoding. The compute budget may remain the same for processing the inputs of the batch, however, the portions of the budget allocated between the inputs may be updated for different timesteps. For example, the compute budget for a particular hardware system, a batch size of two inputs and a particular input length may be ten tokens, at a first timestep both inputs of the batch may be allocated five tokens each, and at a second timestep the allocation may be modified, where processing of the first input may be allocated three tokens and processing of the second input may be allocated seven tokens (totaling to the compute budget of ten tokens). In some cases, the system’s confidence level may be based on the draft model’s confidence in generating the speculative tokens and/or the acceptance rate of the speculative tokens by the target model. In some cases, the system’s confidence corresponding to a prior timestep may be used to determine the allocated budget for a current timestep of processing an input. In examples where the draft model confidence is high in generating speculative tokens for a prior timestep, then the allocated budget may be increased for the current timestep (i.e., the draft model may generate more speculative tokens/a larger chunk of a response for verification for the current timestep). In examples, where the target model accepts the speculative tokens of the prior timestep, the allocated budget may be increased for the current timestep. In other examples, where the draft model confidence is low in generating speculative tokens for a prior timestep, then the allocated budget may be decreased for the current timestep (i.e., the draft model may generate fewer speculative tokens/a smaller chunk of a response for verification for the current timestep). In other examples, where the target model rejects the speculative tokens of the prior timestep, the allocated budget may be decreased for the current timestep.

By controlling the number of speculative tokens generated, the system may also control, for a timestep, whether the draft model is to generate speculative tokens or not, which also controls when the target model performs verification versus generation. In other words, the techniques described herein can be used to control when to speculate during speculative decoding and how much to speculate.

Teachings of the present disclosure provide, among other things, improved computer processing for speculative decoding for generative models by determining draft token tree sizes based on hardware properties, batch size and input context. The techniques described herein can reduce user-perceived latency and improve performance and efficiency in terms of resource usage (e.g., computational resources, time, cost, etc.).

A system according to the present disclosure will ordinarily be configured to incorporate user permissions and only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

Language modeling is the use of various statistical and probabilistic techniques to determine the probability of a given sequence of words occurring in a sentence. Language models analyze bodies of text data to provide a basis for their word predictions. The language models are generative models, that is they are configured to generate a sequence of data (for example representing text) based on input data, such as one more text prompts. In some embodiments, one or more of the language models may be a large language model. A Large Language Model (LLM) is a type of artificial intelligence system that is trained on vast amounts of text data to understand and generate human-like language in response to an input prompt. LLMs use deep learning algorithms, specifically neural networks, to learn patterns and relationships within the training data, enabling them to make predictions about language based on the context provided. These models can perform various natural language processing tasks, such as text generation, language translation, question answering, and sentiment analysis. An LLM analyzes an input prompt and generates an answer or response based on its training and understanding of the prompt. In some embodiments, a language model (or another type of generative model) may be further designed to process, understand, and/or generate multi-modal data including audio, text, image, and/or video.

LLMs are capable of producing coherent and contextually relevant text, making them useful tools in applications like chatbots, content creation, and virtual assistants. As compared to a relatively smaller language model, an LLM uses an expansive training dataset and can include a relatively large number of parameters (in the range of billions, trillions or more), hence they are called "large" language models. In some embodiments one or more of the language models (and their corresponding operations, discussed herein below) may be the same language model. As the name suggests, LLMs are characterized by their large size, often containing billions of parameters, which allows them to capture and learn from the intricacies and nuances of human language. Some well-known examples of LLMs include GPT (Generative Pre-trained Transformer) models, BERT (Bidirectional Encoder Representations from Transformers), and XLNet. A language model may be built using deep learning techniques, such as neural networks, and may be trained on extensive datasets that include text (or other type of data, such as multi-modal data including text, audio, image, video, etc.) from a broad range of sources, such as old/permitted books and websites, for natural language processing. As compared to a relatively smaller language model, an LLM uses an expansive training dataset and can include a relatively large number of parameters (in the range of billions, trillions or more), hence they are called "large" language models. In some embodiments one or more of the language models (and their corresponding operations, discussed herein below) may be the same language model.

In some embodiments, the language model(s) may be transformer-based sequence to sequence (seq2seq) models involving an encoder-decoder architecture. In an encoder-decoder architecture, the encoder may produce a representation of an input (e.g., audio, text, image, video, etc.) using a bidirectional encoding, and the decoder may use that representation to perform some task. In some such embodiments, one or more of the language models may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the language model may be pre-trained for approximately 1 trillion tokens. Being trained on CLM tasks, the language model(s) may be capable of in-context learning. Examples of such language models include some of the Amazon Alexa and Amazon Web Services (AWS) Titan family of generative models.

In other embodiments, the language model(s) may be a decoder-only architecture. The decoder-only architecture may use left-to-right (unidirectional) encoding of the input (e.g., audio, text, image, video, etc.). Examples of such language models include others in the Amazon Alexa and AWS Titan family of models as well as the Generative Pre-trained Transformer 3 (GPT-3), GPT-4, and other versions of GPT. GPT-3 reportedly has a capacity of (approximately) 175 billion machine learning parameters. GPT-4 reportedly has a capacity of (approximately) 1.76 trillion machine learning parameters.

Other examples of language models include BigScience Large Open-science Open-access Multilingual Language Model (BLOOM), Language Model for Dialogue Applications model (LaMDA), Bard, Large Language Model Meta AI (LLaMA), etc.

In some embodiments, the system may include one or more machine learning models (e.g., discriminative models) instead of or in addition to the generative model(s). Such machine learning model(s) may receive text and/or other types of data as inputs (e.g., audio, image, video, etc.), and may output text and/or the other types of data. Such model(s) may be neural network-based models, deep learning models, classifier models, autoregressive models, seq2seq models, etc.

In some embodiments, the input to a generative model may be in the form of a prompt. A prompt may be a natural language input, for example, a directive or request, for the generative model to generate an output according to the prompt. The output generated by the generative model may be a natural language output responsive to the prompt. In some embodiments, the output may additionally or instead be another type of data, such as audio, image, video, etc. The prompt and the output may be text in a particular language (e.g., English, Spanish, German, etc.). For example, for an example prompt "how do I cook rice?", the generative model may output a recipe (e.g., a step-by-step process represented by text, audio, image, video, etc.) to cook rice. As another example, for an example prompt "I am hungry. What restaurants in the area are open?", the generative model may output a list of restaurants near the user that are open at the time of the user prompt.

The generative models may be configured using various learning techniques. For example, in some embodiments, the language models may be configured using few-shot learning. In few-shot learning, the model learns how to learn to solve the given problem. In this approach, the model is provided with (e.g., in the prompt) a limited number of examples (i.e., "few shots") from the new task, and the model uses this information to adapt and perform well on that task. Few-shot learning may require fewer amount of training data than implementing other fine-tuning techniques. Few-shot learning may be implemented by including examples (exemplars) in a prompt to the model and the model may perform in-context learning. For further example, in some embodiments, the language models may be configured using one-shot learning, which is similar to few-shot learning, except the model is provided with a single example (e.g., in the prompt). As another example, in some embodiments, the language models may be configured using zero-shot learning. In zero-shot learning, the model solves the given problem without examples of how to solve the specific/similar problem and just based on the model's training dataset. In this approach, the model is provided with data not observed during training, and the model learns to generate an appropriate output based on its learning with regard to other data. Other learning techniques may involve performing offline/training operations for fine-tuning (e.g., using supervised fine-tuning techniques) a pre-trained generative model for a particular task.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

As used herein, a "dialog" may refer to multiple related user inputs and system outputs (e.g., through user device(s)) between the system and the user that may have originated with a single user input initiating the dialog. Thus, the data associated with a dialog may be associated with a same dialog identifier, which may be used by components of the overall system 100 to associate information across the dialog. Subsequent user inputs of the same dialog may or may not start with the user speaking a wakeword. Each natural language input may be associated with a different natural language input identifier, and each natural language input identifier may be associated with a corresponding dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

FIG. 1 is a conceptual diagram illustrating example components and processing used to determine compute budgets for various batch sizes and input context lengths, according to embodiments of the present disclosure. A system may be configured to determine compute budgets based on hardware properties of a particular hardware system 105. The hardware system 105 may include one or more processors, one or more memory, and/or other components. The hardware system 105 may be a computing processing unit or multiple computing processing units. In example embodiments, the hardware system 105 may be a graphics processing unit (GPU) including one or more multiprocessors 110, a cache 115 and a global memory 120. The GPU-type hardware system 105 may include further components. In examples, the multiprocessor(s) 110 may be streaming multiprocessors that operate independently of each other, including its own register file, shared memory, L1 cache and other components. The multiprocessor(s) 110 may operate in a parallel manner processing a large number of threads concurrently to enable high throughput in GPU computing tasks. The multiprocessor(s) 110 performance may be measured in floating point operations per second (FLOPS, the number of floating operations performable each second). The cache 115 may be a L2 cache with a high bandwidth memory that is shared among the multiprocessors 110 with a goal to optimize memory access and data transfer efficiency within the hardware system. In example embodiments, the global memory 120 may be a DRAM memory providing a large pool of memory for storing data and instructions needed for computation. In example embodiments, the DRAM may be organized in a hierarchy, with multiple memory banks and channels to enable high-speed access. The global memory 120 properties may determine how large of a generative model can be loaded on the hardware system 105, and the compute FLOPS and memory bandwidth may determine the throughput which can be obtained.

In other example embodiments, the hardware system 105 may be an AI accelerator(s), a neural processing unit(s) (NPUs), a central processing unit(s) (CPUs), or other type of hardware that may be used to execute a generative model.

Performance of the hardware system 105, in particular for inferencing tasks using a generative model, may depend on how quickly the model weights and parameters can be transferred from the global memory 120 to the multiprocessor(s) 110 and how efficiently and quickly the multiprocessor(s) 110 can process the given calculations. When the compute capacity is higher/faster than the data transfer rate between memory to processor, the processor will have to wait (waste time) for data to process and thus compute is underutilized. Such a situation, where memory bandwidth is lower than the consumption rate is known as memory-bound phase. On the other hand, if the compute is taking more time for processing and if more data is queued for computation, this state is known as a compute-bound phase. To take advantage of the hardware system 105 in generative model inferencing tasks, a compute-bound state is desirable while processing the required computations as efficiently as possible.

One of the properties of the hardware system 105 may include operations-to-byte (ops:byte) ratio, which may be used to determine a compute budget as described herein. The ops:byte ratio may indicate how many FLOPS can be completed for every byte of memory accessed. In examples, the ops:byte ratio may be calculated using a ratio of compute bandwidth and memory bandwidth. If the hardware system is able to complete fewer operations than the ops:byte ratio, then the system performance may be memory-bound, indicating that the speed and efficiency of the system are constrained by the rate at which data can be transferred. If the hardware system can complete more operations than the ops:byte ratio, then the system may be compute-bound where effectiveness and performance are not restrained by memory but rather by the number of compute units included in the hardware.

Some embodiments involve determining a compute budget including a number of tokens to be verified when performing speculative decoding. In a two-step approach, the first step may involve processing performed during offline operations to determine a "function" to calculate the compute budget based on a batch size and an input context length. The batch size indicates a number of inputs processed in parallel by the hardware system 105. The input context length indicates a number of tokens included in an input processed by the hardware system 105. With respect to speculative decoding, to understand the memory-transfer and compute trade-off, some embodiments evaluate a ratio of time taken for verifying X tokens to time taken for a single decoding step. The verifying step is performed by a target generative model (e.g., a target generative model 150) and involves verification (e.g., acceptance or rejection) of a number of tokens (X tokens) generated by a draft model (e.g., a draft generative model 155). The decoding step is performed by the target generative model and involves the model generating a token, which is usually a single token. When the ratio of time taken for verifying X tokens to time taken for a single decoding step is close to one, the system processing may be memory-bound; the ratio increases (in a linear manner) as the value of X increases and system processing moves towards a compute-bound scenario. In some embodiments, the value of X (i.e., the number of tokens to be verified) depends on the properties of the hardware system 105, the batch size and the input context lengths.

The system may include a compute budget determination component 130, which may be configured to learn a function for given hardware to calculate a compute budget for speculative decoding. In some embodiments, the function may be defined as below:

$$f(\text{batch size, context lengths}) = \max_x\left\{X \,\middle|\, \frac{T_{verify}(X, \text{batch\_size, context\_lengths})}{T_{decode}(\text{batch\_size, context\_lengths})} \sim 1\right\}, \quad \text{Eq. 1}$$

where $T_{verify}$ (X, batch_size, context_lengths) is the time taken by the target model to verify X tokens and $T_{decode}$ (X, batch_size, context_lengths) is the time taken by the target model to perform a single decoding step. The compute budget determination component 130 may determine the maximum value of X beyond which the verification-to-decoding time ratio deviates from 1, indicating a compute-bound scenario.

Figure 2:
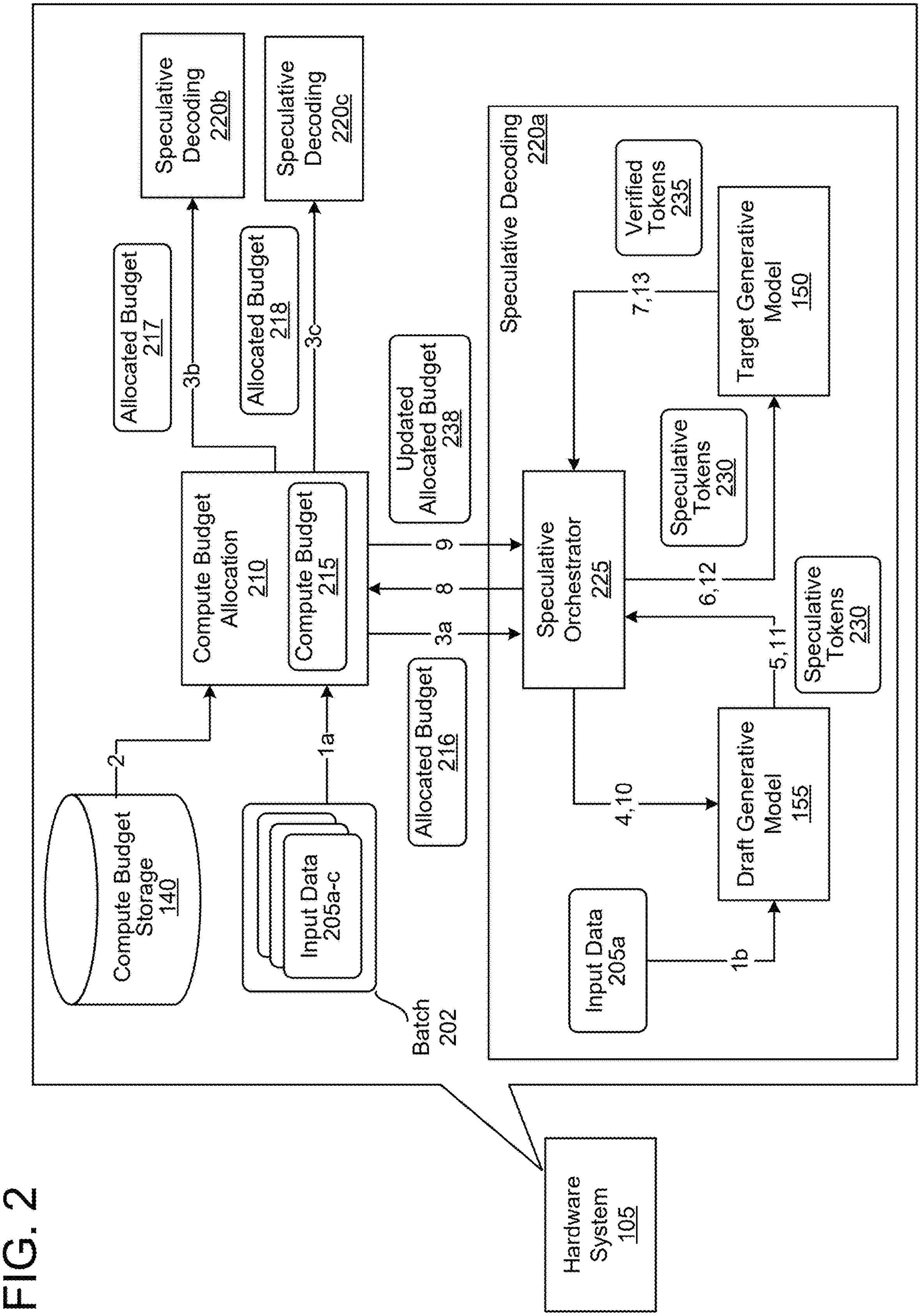
FIG. 2 is a conceptual diagram illustrating example components and processing of a system to perform speculative decoding using a compute budget allocated across a batch of inputs, according to embodiments of the present disclosure.

The compute budget determination component 130 may learn the function of Equation 1 by measuring verification and decoding times for various batch sizes, various context lengths and various X values. The learned function (e.g., function 136) may be stored (e.g., in a compute budget storage 140). At inference time (as shown in FIG. 2), a lookup of the function may provide the maximum compute budget available (maximum number of tokens that can be verified in a timestep) to avoid system processing becoming compute-bound.

To learn the function, the compute budget determination component 130 may measure the times of Equation 1 while speculative decoding is performed using the hardware system 105. Speculative decoding may be performed with respect to various sample inputs 125 and using the target generative model 150 and the draft generative model 155. By using the particular hardware system 105, the function 136 learned by the compute budget determination component 130 is based on the hardware system 105 properties (e.g., the ops:byte ratio), which can impact when processing is memory-bound versus compute-bound.

The target generative model 150 may be a language model, a multi-modal generative model, or another type of generative model, examples of which are described above. The target generative model 150 may be the main inferencing model to be used to process an input and generate a response to the input. The target generative model 150 may be a larger generative model with more robust inferencing capabilities as compared to the draft generative model 155. As such, the target generative model 150 may take longer to perform a single decoding step to generate a token of the response to the input. Comparatively, the draft generative model 155 may be a smaller model with less robust/accurate inferencing capabilities; the draft generative model 155 may take less time to generate tokens of a response to the input. The tokens generated by the draft generative model 155 may be speculative tokens (e.g., potential tokens, draft tokens, etc.) representing a potential response (or a portion thereof) to the input.

As described herein, the target generative model 150 may perform a verification step, where the model may verify (e.g., accept or reject) the speculative tokens generated by the draft generative model 155. The target generative model 150 may perform the verification step during a single timestep and may thus verify multiple tokens during a single timestep. The value of X in the Equation 1 represents the number of speculative tokens verified by the target generative model 150. In some cases, the target generative model 150 may accept one or more of the speculative tokens, where acceptance indicates the speculative tokens correspond to an accurate/correct response to the input. In other cases, the target generative model 150 may reject one or more of the speculative tokens, where rejection indicates the speculative tokens fail to correspond to an accurate/correct response to the input. In such cases, the target generative model 150 may perform a decoding step to generate a token (e.g., the next token of the response). In the next iteration, the draft generative model 155 may generate next speculative tokens based on the tokens of the response generated thus far (e.g., accepted speculative tokens and a token(s) generated by the target generative model 150). In other examples, the target generative model 150 may not perform a decoding step, but rather the draft generative model 155 may generate different or further speculative tokens for verification. Further details on speculative decoding are described below.

The target generative model 150 and the draft generative model 155 may process the sample inputs 125. The sample inputs 125 may include one or more of text data, image data, audio data and video data. The sample inputs 125 may be manually generated and/or machine-generated inputs. In some embodiments, the sample inputs 125*a-n* may be a batch of inputs to be processed in parallel by the hardware system 105.

The compute budget determination component 130 may receive the sample inputs 125 and/or data corresponding to the sample inputs 125 and may use the received inputs or corresponding data to determine a batch size 132. In examples, the data corresponding to the sample inputs 125 may include a number of inputs in the group/batch, length/number of tokens in each of the inputs, etc. The batch size 132 may indicate the number of sample inputs processed in parallel. The compute budget determination component 130 may use the batch size 132 to learn the function 136. In non-limiting examples, the compute budget determination component 130 may learn the function 136 based on batch sizes ranging from 1 to 8. To enable determining the function 136 based on different batch sizes, the hardware system 105 may process different batch sizes of sample inputs 125.

The compute budget determination component 130 may use the sample inputs 125 or data corresponding to the sample inputs 125 to determine a sample input context length 134. The sample input context length 134 may indicate a number of tokens included in the sample input 125. In some embodiments, the system may process a batch of inputs that correspond to a similar context length (i.e., have a similar number of tokens). As such, to determine the compute budget, the hardware system 105 may process sample inputs 125 corresponding to a similar context length. The compute budget determination component 130 may use the input context length to learn the function 136. In non-limiting examples, the compute budget determination component 130 may learn the function 136 based on input context lengths ranging from 100 tokens to 8000 tokens. In some embodiments, the sample input context length 134 used to learn the function 136 may include a range of context lengths. For example, a first context length used in Equation 1 may include 100 to 200 tokens, a second context length used in Equation 1 may include 201 to 400 tokens, a third context length used in Equation 1 may include 1000 to 4000 tokens, a fourth context length used in Equation 1 may include 4000 to 8000 tokens, and so on.

Based on the target generative model 150 processing of the sample inputs 125 and the speculative tokens generated by the draft generative model 155, and the sample inputs 125 processed in parallel, the compute budget determination component 130 may determine the time taken by the target generative model 150 to verify X speculative tokens and the time taken by the target generative model 150 to perform a decoding step. Using the determined times, the compute budget determination component 130 may determine the ratio indicated in Equation 1. Based on that ratio being one (or close to one), the compute budget determination component 130 may determine the value of X for the particular batch size and input context length. In other words, the compute budget determination component 130 may determine the maximum number of tokens that the target generative model 150 can verify in the same amount of time it takes to perform a decoding step, given the batch size (the number of inputs processed in parallel by the hardware system 105) and the input context length.

In some embodiments, as described above, the compute budget determination component 130 may learn the function 136 based on processing the sample inputs 125, which may be received and processed particularly for this task. In other embodiments, the compute budget determination component 130 may receive data corresponding to speculative decoding processing that may have been previously performed by the target generative model 150, where such data may include at least times taken by the target generative model 150 to verify different numbers of speculative tokens, times taken by the target generative model 150 to perform a decoding step, corresponding batch size, context lengths of the inputs processed, etc.

The compute budget determination component 130 may store data in the compute budget storage 140 based on the sample inputs 125 and learning the function of Equation 1. In some embodiments, the function 136 learned by the compute budget determination component 130 may be stored. In some examples, the function 136 may be used to plot a graph based on various batch sizes and various sample context lengths, where the graph may be used to determine a corresponding value of X for which speculative decoding processing performed by the particular hardware system 105 is not compute-bound. In some embodiments, in addition to or instead of the function 136, the compute budget storage 140 may store a compute budget 135 associated with a batch size 132 and a sample input context length 134. The compute budget 135 may be determined using the function 136 and may include the value of X (the maximum number of tokens to be verified by the target generative model 150) for the batch size 132 and the sample input context length 134. The compute budget storage 140 may include multiple compute budgets 135 corresponding to different batch sizes and context lengths. For example, a first compute budget 135 may include a maximum number of tokens to be verified by the target generative model 150 when the batch size 132 is one and the sample input context length 134 is 4000 to 8000 tokens. As another example, a second compute budget 135 may include a maximum number of tokens to be verified by the target generative model 150 when the batch size 132 is four and the sample input context length 134 is 400 to 800 tokens.

The compute budget storage 140 may include data corresponding to the hardware system 105 as the function 136 and the compute budget 135 is determined based on the properties of the hardware system 105. In other words, the function 136 and the compute budget 135 is based on the hardware's performance in terms of compute/processor capabilities (compute bandwidth) and memory capabilities (memory bandwidth). In some embodiments, the compute budget storage 140 may be included in the hardware system 105. In some embodiments, the compute budget storage 140 may be included in another system component, such that the stored data may be accessible by other instances of the hardware system 105 or other hardware of different types.

In some embodiments, the compute budget storage 140 may be used to determine compute budget for inputs processed by a hardware system that has similar properties/specifications (which are usually indicated by the manufacturer or can be calculated) as the hardware system 105. For example, the function 136 and/or the compute budget 135 may be determined using the hardware system 105 that is associated with first specifications including a first ops:byte ratio, a first global memory size, a first memory bandwidth, a first compute bandwidth, etc. During inference/runtime operations, a second hardware system (including one or more processors, one or more memory, etc.) may be used to process inputs (e.g., using speculative decoding). The second hardware system may be associated with second specifications including a second ops:byte ratio, a second global memory size, a second memory bandwidth, a second compute bandwidth, etc. Based on determining that the first specifications and the second specifications are similar (e.g., at least one of the properties are similar within a threshold condition), the function 136 or the compute budget 135 may be used to perform speculative decoding using the second hardware system.

In a non-limiting example, to illustrate the techniques described herein, assume that the ratio (indicated in Equation 1) is computed for ten tokens (X=10), which means that ten tokens are verified by the target generative model 150. The ratio of the time to verify ten tokens versus the time to decode/generate one token is determined. If the hardware system 105 is capable of completely parallelizing verification and decoding steps for ten tokens, then this ratio would be one, thus, providing an estimate of how well the hardware is able to parallelize these tasks. For some X value/number of tokens (in this case a number of tokens greater than ten), the ratio increases (i.e., the time to verify X tokens is greater than the time it takes to generate one token) indicating that the verification and decoding tasks cannot be parallelized efficiently. As discussed herein, the foregoing ratio depends on the hardware's memory and processor capabilities.

In example embodiments, the compute budget 135 and/or the function 136 may be determined using one or more specifications associated with the hardware system 105 rather than running speculative decoding tasks using the hardware as described above. For example, a compute budget may be determined (e.g., estimated, predicted, etc.) using one or more of the ops:byte ratio, memory bandwidth, and compute bandwidth associated with the hardware system 105. In some examples, the hardware system specifications may be used to determine an initial/draft function for a compute budget, then the initial/draft function may be updated based on performing speculative decoding tasks using the hardware system and measuring the times taken by a target generative model to verify tokens and decode a token.

FIG. 2 is a conceptual diagram illustrating example components and processing of the system to perform speculative decoding using a compute budget allocated across a batch of inputs, according to embodiments of the present disclosure. In example embodiments, a batch 202 of inputs 205*a-c* may be processed using the hardware system 105, where the inputs 205*a-c* may be processed in parallel. To perform speculative decoding processing, the hardware system 105 may use multiple instances of a speculative decoding component 220 where each instance may process an individual instance of input data 205. As described below, a compute budget allocation component 210 may determine a compute budget 215 representing a maximum number of tokens to be verified by the target generative model 150 during a timestep. As described herein, the number of tokens indicated in the compute budget 215 may enable efficient use of the hardware system 105 (e.g., memory capabilities and processing capabilities) by at least preventing system processing from becoming compute-bound. The compute budget allocation component 210 may determine (e.g., allocate, distribute, divide, assign, etc.) an allocated budget for each input being processed in parallel, where the allocated budgets combined satisfy the compute budget 215 (e.g., the allocated budgets summed up equals (or does not exceed) the compute budget 215). For example, if the compute budget 215 is ten tokens and the batch 202 includes three inputs, then the compute budget allocation component 210 may determine the budget is to be allocated as follows: three tokens for a first input; two tokens for a second input; and five tokens for a third input. In this manner, the compute budget 215 may be divided among the inputs of the batch 202.

As shown, in some embodiments, the batch 202 of input data 205*a-c* may be processed during runtime/inference operations. The input data 205 may be similar to user input data 427 described below. The batch 202 may be provided (step 1*a*) to the compute budget allocation component 210, which may use the batch size and input context length to determine the compute budget 215. At runtime, the number of inputs in the batch 202 may be known, as well as the length of the inputs. At the step 1*a*, the compute budget allocation component 210 may receive the batch size (the number of inputs in the batch 202) and the length of the input data 205 in the batch (the number of tokens in the input data 205) or a range of the input data length (e.g., 400 to 800 tokens, 1000 to 4000 tokens, etc.). In other examples, the compute budget allocation component 210 may determine the batch size and the input data length based on the received batch 202.

In some embodiments, the compute budget allocation component 210 may retrieve (step 2), from the compute budget storage 140, the function 136 (previously determined as described in relation to FIG. 1). The compute budget allocation component 210 may use the function 136 along with the batch size and input data length (e.g., as inputs to the function) to determine the compute budget 215. In other embodiments, the compute budget allocation component 210 may retrieve (at the step 2), from the compute budget storage 140, the compute budget 135 associated with the batch size 132 that is the same as the size of the batch 202 and the sample input context length 134 that is the same as the input data length of the input data 205. The retrieved compute budget 135 may then be used as the compute budget 215 for the instant system processing.

To enable processing of multiple input data 205 in parallel, the system may include multiple instances of the speculative decoding component 220. In some embodiments, individual speculative decoding components 220 may include a separate instance of the draft generative model 155 and the target generative model 150. In other embodiments, the multiple speculative decoding components 220*a-c* may be in communication with the same instance of the draft generative model 155 and the target generative model 150 (i.e., one instance of the draft generative model 155 and the target generative model 150 may be loaded on the hardware system 105). In some embodiments, the individual speculative decoding components 220 may include a separate instance of a speculative orchestrator 225, which may be configured to facilitate speculative decoding processing with respect to an individual instance of the input data 205.

The compute budget allocation component 210 may determine an allocated budget for each input of the batch 202. The allocated budget may be provided to the corresponding instance of the speculative decoding component 220. For example, the compute budget allocation component 210 may determine an allocated budget 216 representing a maximum number of tokens to be verified by the target generative model 150 when processing the input data 205*a*. The compute budget allocation component 210 may send (step 3*a*) the allocated budget 216 to the speculative decoding component 220*a*, in particular to the speculative orchestrator 225. As further example, the compute budget allocation component 210 may determine an allocated budget 217 representing a maximum number of tokens to be verified by the target generative model 150 when processing the input data 205*b*, and may send (step 3*b*) the allocated budget 217 to the speculative decoding component 220*b*, which may process the input data 205*b*. As yet further example, the compute budget allocation component 210 may determine an allocated budget 218 representing a maximum number of tokens to be verified by the target generative model 150 when processing the input data 205*c*, and may send (step 3*c*)

the allocated budget 218 to the speculative decoding component 220*c*, which may process the input data 205*c*. In examples, the allocated budgets 216, 217 and 218 correspond to (e.g., add to up, etc.) the compute budget 215. For the initial budget allocation (e.g., for the first timestep), the compute budget allocation component 210 may divide the compute budget 215 randomly or in as equal parts as possible. In other examples, the compute budget allocation component 210 may determine the initial allocated budget based on the input context length, for example, the input with the most number of tokens may be assigned a larger allocated budget as compared to the input with the least number of tokens.

In some embodiments, while the compute budget allocation component 210 is processing (per one or more of the steps 1*a*, 2 or 3), the draft generative model 155 may receive (step 1*b*) the input data 205*a* for processing. Based on processing the input data 205*a*, the draft generative model 155 may generate a set of speculative tokens 230. The speculative tokens 230 may include a sequence of tokens potentially corresponding to a response (or a portion of a response) to the input data 205*a*. In some embodiments, the speculative orchestrator 225 may provide (step 4) the allocated budget 216 to the draft generative model 155. In examples, the allocated budget 216 may be used to determine (e.g., set, define, configure, etc.) a configuration value (e.g., a parameter, a hyperparameter, etc.) that controls the number of speculative tokens generated by the draft generative model 155. In such embodiments, the draft generative model 155 may generate speculative tokens 230 corresponding to the allocated budget 216. That is, the number of the speculative tokens 230 may not exceed the number of tokens indicated in the allocated budget 216. The speculative tokens 230 may be sent (step 5) to the speculative orchestrator 225. In example embodiments, the speculative orchestrator 225 may also receive other data corresponding to the speculative tokens 230 such as, a confidence score associated with the sequence of the speculative tokens 230, confidence scores associated with the individual speculative tokens 230, etc.

In other embodiments, the compute budget allocation component may determine an (initial) allocated budget for processing an instance of input data based on the speculative tokens 230 generated by the draft generative model 155, rather than determining the allocated budget 216 based on receiving the input data 205. For example, the speculative orchestrator 225 may send the speculative tokens 230 and corresponding other data (e.g., model confidence in generating the speculative tokens 230) to the compute budget allocation component 210, and based on, for example, the model confidence corresponding to the speculative tokens 230, the compute budget allocation component 210 may determine the allocated budget 216 corresponding to processing of the input data 205*a*. Similarly, the compute budget allocation component 210 may receive speculative tokens and corresponding model confidence from the speculative decoding component 220*b* and the speculative decoding component 220*c*, and may determine the corresponding allocated budgets 217, 218 based on the received model confidences. In such other embodiments, the initial allocated budgets 216, 217, 218 may be based on the draft generative model 155 processing of the input data 205 and may take into consideration, for example, the model's confidence in generating speculative tokens, which may represent a complexity of the input data 205. When the draft generative model 155 is confident in generating speculative tokens (e.g., the input data is easy or simple for the draft generative model 155 to process), the compute budget allocation component 210 may determine a higher (initial) allocated budget, and when the draft generative model 155 is not confident in generating the speculative tokens (e.g., the input data is difficult or complex for the draft generative model 155 to process), the compute budget allocation component 210 may determine a lower (initial) allocated budget.

The speculative orchestrator 225 may send (step 6) the speculative tokens 230 to the target generative model 150 for verification. During a single timestep, the target generative model 150 may process the speculative tokens 230 to determine whether they correspond to an accurate/desired response to the input data 205*a*. Although not shown, the target generative model 150 may receive the input data 205*a* also (e.g., in parallel to the step 1*b*, at the step 6 or sometime before the step 6). As described herein, the speculative tokens 230 may not exceed the maximum number of tokens that can be verified by the target generative model 150 without the system processing becoming compute-bound. Such maximum number of tokens is calculated and included in the compute budget 215 and the allocated budget 216 for the instant input data 205*a* is smaller than the maximum number of tokens. Further, the sum of the allocated budget, for each of the inputs of the batch 202 that are being processed in parallel, does not exceed (is equal to) the compute budget 215. As such, the verification processing performed by the target generative model 150 at a given timestep with respect to the inputs of the batch 202 does not transition the system processing to a compute-bound scenario.

The target generative model 150 may process the speculative tokens 230 and may determine verified tokens 235. The verified tokens 235 may include the speculative tokens 230 or a portion thereof. For example, if the target generative model 150 accepts all of the speculative tokens 230, then the verified tokens 235 may include the speculative tokens 230. As another example, if the target generative model 150 accepts some of the speculative tokens 230 (e.g., speculative tokens include "This is part of a system"), then the verified tokens 235 may include a portion/the accepted speculative tokens (e.g., verified tokens include "This is part of"). The target generative model 150 may send (step 7) the verified tokens 235 to the speculative orchestrator 225. In example embodiments, the speculative orchestrator 225 may also receive other data corresponding to the verified tokens 235 such as, a confidence score associated with the sequence of the verified tokens 235, confidence scores associated with the individual verified tokens 235, etc.

In some embodiments, the speculative orchestrator 225 may send (step 8) a request for an updated allocated budget for the next timestep. The request, in some examples, may include the speculative tokens 230, confidence scores associated with the speculative tokens 230, the verified tokens 235, and/or confidence scores associated with the verified tokens 235. In some examples, the request may include data representing a number of tokens accepted (or rejected) by the target generative model 150.

Based on receiving the request and the data included in the request, the compute budget allocation component 210 may determine an updated allocated budget 238 representing a maximum number of tokens to be verified by the target generative model 150 during a subsequent (e.g., next, second, etc.) timestep when continuing processing of the input data 205*a*. The updated allocated budget 238, along with the allocated budgets or updated allocated budgets, may correspond to (i.e., may not exceed) the compute budget 215. The compute budget 215 corresponds to the particular batch 202 and input context length(s) of the input data 205 and may remain constant/same while the hardware system 105 processes the batch 202. The allocated budget for each input instance may change/update on a timestep basis; while the total/sum of the allocated budget does not exceed the compute budget 215. As such, based on the updated allocated budget 238, the compute budget allocation component 210 may determine updated allocated budgets for the other inputs of the batch for the same timestep.

In some embodiments, the compute budget allocation component 210 may determine the updated allocated budget 238 based on processing performed by the draft generative model 155 and/or the target generative model 150. In some examples, the compute budget allocation component 210 may determine the updated allocated budget 238 based on the draft generative model's confidence in generating the speculative tokens 230. In some examples, the compute budget allocation component 210 may determine the updated allocated budget 238 based on the target generative model's confidence in verifying the speculative tokens 230/generating the verified tokens 235. In some examples, the compute budget allocation component 210 may determine the updated allocated budget 238 based on a number of speculative tokens 230 accepted (or rejected) by the target generative model 150.

In some cases, the updated allocated budget 238, for a subsequent timestep, may be greater than the allocated budget 216 for a first/initial timestep. In other cases, the updated allocated budget 238 may be smaller than the allocated budget 216. In yet other cases, the updated allocated budget 238 may be the same as the allocated budget 216.

In some embodiments, the compute budget allocation component 210 may determine the updated allocated budget 238 based on a complexity measure associated with the input data 205*a*. The compute budget allocation component 210 may determine the complexity measure based on the draft generative model 155 confidence with respect to the input data 205*a*. For example, for comparatively complex or difficult inputs, the draft generative model 155 may have low confidence in determining speculative tokens representing a response to the input. For such inputs, the target generative model 150, which is a more robust model, may be better suited to determine a response (e.g., by performing decoding steps). As another example, for comparatively simple inputs, the draft generative model 155 may have high confidence in determining speculative tokens representing a response to the input. For such inputs, it may be more efficient for the target generative model 150 to verify multiple tokens in a single timestep rather than performing a decoding step to generate a single token. Based on such observations, the compute budget allocation component 210 may be configured to allocate larger budgets for processing inputs associated with higher draft model confidences. In example embodiments, the updated allocated budget 238 may be larger than the allocated budget 216 if the draft generative model 155 confidence is high (e.g., satisfies a certain "high" threshold condition). In example embodiments, the updated allocated budget 238 may be smaller than the allocated budget 216 if the draft generative model 155 confidence is low (e.g., satisfies a certain "low" threshold condition). In some embodiments, the compute budget allocation component 210 may consider (e.g., compare) the draft generative model's confidence with respect to the inputs of the batch 202 and may determine the updated allocated budget for each batch input accordingly. For example, for a second or later timestep an input associated with the highest/best draft model confidence may be allocated a larger portion of the compute budget 215, while an input associated with the lowest/worst draft model confidence may be allocated a smaller portion of the compute budget 215.

In some embodiments, the allocated budget may be updated for each timestep. In other embodiments, the allocated budget may be updated for predefined timesteps (e.g., third timestep, fifth timestep, etc.). In other embodiments, the allocated budget may be updated when a certain condition(s) occurs (e.g., the target generative model 150 rejects all of the speculative tokens, the target generative model 150 accepts all of the speculative tokens, the draft generative model 155 has at least a threshold low confidence, the draft generative model 155 has at least a threshold high confidence, etc.). In some embodiments, the speculative orchestrator 225 may request updated allocated budget when the condition occurs. In other embodiments, the compute budget allocation component 210 may only determine the updated allocated budget when the condition occurs.

The compute budget allocation component 210 may send (step 9) the updated allocated budget 238 to the speculative orchestrator 225. The speculative orchestrator 225 may send (step 10) the updated allocated budget 238 to the draft generative model 155, which may generate the next speculative tokens of the response to the input data 205*a*, where the number of the next speculative tokens may not exceed the updated allocated budget 238. Although not shown, in some embodiments, the draft generative model 155 may receive and process the verified tokens 235 to generate the next speculative tokens. The next speculative tokens may represent a sequence of tokens that potentially follow the verified tokens 235 as part of the response to the input data 205*a*.

The draft generative model 155 may send (step 11) the next speculative tokens to the speculative orchestrator 225, which may send (step 12) the next speculative tokens to the target generative model 150 for verification. In a similar manner as described above, the target generative model 150 may generate next verified tokens based on accepting (or rejecting) the next speculative tokens. The next verified tokens may be sent (step 13) to the speculative orchestrator 225. The processing by the speculative decoding component 220 and the determination of an updated allocated budget by the compute budget allocation component 210 may continue (in a similar manner as described above) until a complete response to the input data 205*a* is generated. When the complete response is generated, tokens representing the response may be sent to another system component, which may present, via a user device, output data (e.g., displayed text, synthesized speech, etc.) corresponding to the tokens.

In some embodiments, the target generative model 150 may verify speculative tokens generated by the draft generative model 155 until a complete response is generated. In such embodiments, when a speculative token(s) is rejected, the draft generative model 155 may attempt to generate different or further speculative tokens, which may be accepted or rejected by the target model. In other embodiments, the target generative model 150 may perform a decoding step to generate a (next) token of the response when a speculative token(s) is rejected, and on the next timestep the draft generative model 155 may use the accepted, if any, speculative token(s) and the target model-generated token to determine the next speculative tokens of the response.

Although not shown, the speculative decoding components 220*b* and 220*c* may perform similar operations with respect to the input data 205*b* and 205*c*, respectively, as the operations described above in relation to the speculative decoding component 220*a*.

Figure 3:
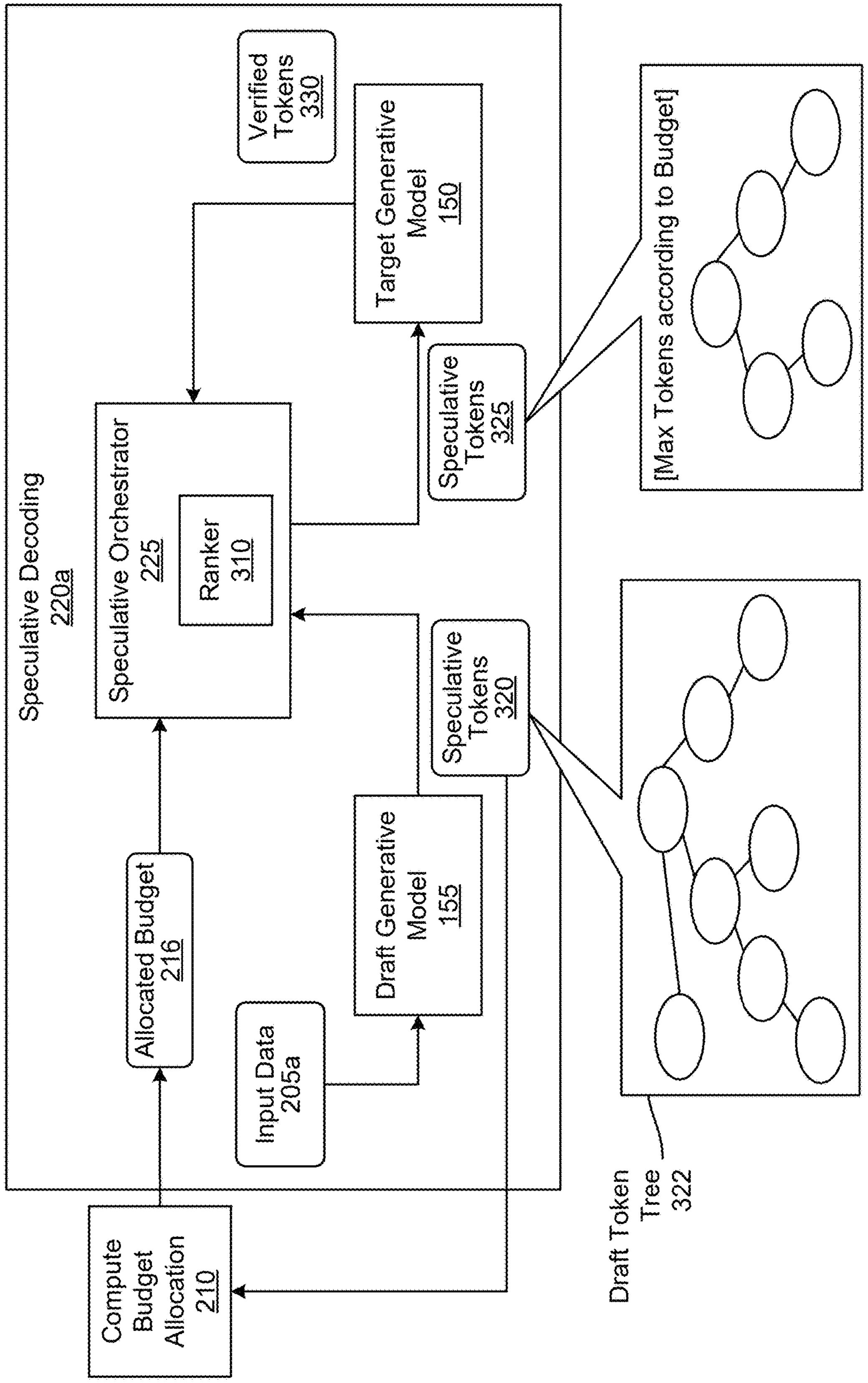
FIG. 3 is a conceptual diagram illustrating another example of processing of the system to perform speculative decoding, according to embodiments of the present disclosure.

In some embodiments, as described in relation to FIG. 2, the allocated budget 216 may be used to control (e.g., limit, restrict, etc.) the number of speculative tokens generated by the draft generative model 155. In other embodiments, the draft generative model 155 may generate speculative tokens without regards to the allocated budget; instead the allocated budget 216 may be used to control (e.g., limit, restrict, select, etc.) how many of those speculative tokens are provided to the target generative model 150 for verification. FIG. 3 is a conceptual diagram illustrating another example of how speculative decoding is performed where the allocated budget may be used to control the number of speculative tokens fed to the target generative model 150.

The draft generative model 155 may process the input data 205*a* and may generate speculative tokens 320 corresponding to a potential response to the input data 205*a*. In some embodiments, the draft generative model 155 may generate multiple sequences of tokens based on varying probability distributions. Such speculative tokens may be included in a tree data structure with each node corresponding to a token and edges representing a sequence of tokens. For example, the speculative tokens 320 may be included in a draft token tree 322. The speculative tokens 320 and other corresponding data may be sent to the speculative orchestrator 225. In some embodiments, the speculative tokens 320 and other corresponding data may be sent to the compute budget allocation component 210 (e.g., by the speculative orchestrator 225, the speculative decoding component 220*a*, etc.). The other corresponding data may include confidence scores(s) representing the draft generative model 155 confidence in generating the speculative tokens 320.

In some embodiments, the draft generative model 155 may be configured to generate multiple tokens for a position/sequence (e.g., a draft token tree 322). In example embodiments, the draft generative model 155 may employ a tree attention mechanism as known in the art. The draft generative model 155 may determine (e.g., expand) nodes for the draft token tree 322 in width (multiple parent nodes) and depth (multiple child nodes) by running forward passes through the draft generative model 155. The nodes in the draft token tree 322 may be associated with confidence scores determined by the draft generative model 155. In example embodiments, the draft generative model 155 may use a greedy-selection technique for determining the draft token tree 322, where the top k tokens with the highest probabilities may be selected as child nodes. Other example embodiments may employ a non-greedy selection technique, where k tokens may be sampled and the k number of child nodes may be inferred at the parent node. The draft generative model 155 may undergo a number of forward passes during the speculation/drafting stage, and during the verification stage the target generative model 150 may obtain each token's probability through a single forward pass.

In some such embodiments (shown in FIG. 3), the compute budget allocation component 210 may determine an allocated budget 216 based on the speculative tokens 320 and the other corresponding data. In example embodiments, the allocated budget 216 may be determined based on the draft generative model 155 confidence (indicated by confidence score(s)) in generating the speculative tokens 320. The compute budget allocation component 210 may also consider the confidence scores corresponding to the speculative tokens generated by the parallel processing of the other input data 205 of the batch 202. In example embodiments, the compute budget allocation component 210 may determine a higher allocated budget for processing the input data 205, when the draft generative model 155 is confident (e.g., confidence scores satisfy a threshold condition) in generating the speculative tokens 320, while a lower allocated budget may be determined when the draft generative model 155 is not confident (e.g., confidence scores fail to satisfy a threshold condition) in generating the speculative tokens 320. The compute budget allocation component 210 may assign a higher allocated budget to the instance of input data 205 associated with the comparatively most confident processing by the draft generative model and may assign a lower allocated budget to the instance of input data associated with the comparatively lowest confident processing. For example, assume that the draft generative model confidence with respect to the input data 205*a* is 0.75, the draft generative model confidence with respect to the input data 205*b* is 0.4 and the draft generative model confidence with respect to the input data 205*c* is 0.2; and the compute budget 215 is ten tokens, then the allocated budget 216 corresponding to the input data 205*a* may be six tokens, the allocated budget 217 corresponding to the input data 205*b* may be three tokens and the allocated budget 218 corresponding to the input data 205*c* may be one token.

The speculative orchestrator 225 may receive the allocated budget 216 that is determined as described above. Based on the allocated budget 216, the speculative orchestrator 225 may determine which of the speculative tokens 320 are to be verified by the target generative model 150. The tokens selected from the speculative tokens 320 may be included in speculative tokens 325, which may be provided to the target generative model 150 for verification. The number of the speculative tokens 325 may not exceed the allocated budget 216 (i.e., the number of the speculative tokens 325 may not exceed the maximum number of tokens to be verified as indicated in the allocated budget). In some cases, the number of the speculative tokens 325 may be less than the number of the speculative tokens 320.

In some embodiments, the speculative orchestrator 225 may include a ranker 310, which may be configured to select a portion of the speculative tokens 320 for verification, where the selection may be performed so that the number of the speculative tokens 325 satisfies the allocated budget 216. In some embodiments, the ranker 310 may select the top-K tokens from the speculative tokens 320, where the top-K tokens may be associated with the top-K confidence scores and the value of K may satisfy the allocated budget 216 (K does not exceed the maximum number of tokens to be verified). In example embodiments, where the draft generative model 155 generates a tree of speculative tokens with multiple parent nodes (e.g., multiple first potential tokens), the ranker 310 may select a parent node with the highest confidence and select the parent node's child nodes (i.e., select a sequence with the first token having the highest confidence. When the draft token tree 322 includes one parent node and a singular branch of child nodes (e.g., the tree is linear and may be a vector of tokens instead), then the ranker 310 may select the K nodes, in sequence, until the allocated budget 216 is reached or may select the top-K nodes that satisfy a certain threshold confidence condition (without exceeding the allocated budget 216). In example cases, the ranker 310 may follow a path on the tree that results in the best overall confidence score to select the nodes/tokens for the speculative tokens 325. In some examples, when the number of tokens in the draft token tree 322 does not exceed the allocated budget 216, all of the speculative tokens in the tree may be selected as the speculative tokens 325 for verification.

As described above, an allocated budget for an input (e.g., the allocated budget 216 and/or the updated allocated budget 238) may be based on the input's complexity or the draft model's confidence in processing the input. Further, the draft generative model 155 may generate a draft token tree based on the input's complexity or the model's confidence in processing the input. For example, for a comparatively easy or simple input, where the draft generative model 155 may have high confidence in processing the input, the draft token tree 322 may be wide and/or deep (e.g., include multiple parent nodes with multiple child nodes) to enable increased parallel speculation. In such cases, the allocated budget may be comparatively large to enable increased parallel verification. As another example, for a comparatively difficult or complex input, where the draft generative model 155 may have low confidence in processing the input, the draft token tree 322 may be narrow and/or shallow (e.g., include fewer parent nodes with fewer child nodes; limited tree expansion). In such cases, the allocated budget may be comparatively smaller to avoid wasted computations on low confidence or inaccurate speculations. As such, using the allocated budget, the draft token tree size or the tree size including the speculative tokens 325 may be controlled.

In other embodiments, the draft generative model 155 may generate the draft token tree 322 to include a number of tokens satisfying the allocated budget 216.

Performing a verification step as described above, the target generative model 150 may output verified tokens 330. The verified tokens 330 may be sent to the speculative orchestrator 225, which may, as described above, request updated allocated budget from the compute budget allocation component 210 and facilitate processing (e.g., in an iterative manner) until a response to the input data 205*a* is determined.

In example embodiments, the allocated budget 216 may be stored as a config value that may be used by one or more of the components shown in FIGS. 2 and 3 to control generation of tokens during speculative decoding.

In this manner, the number of tokens to be verified can be dynamically controlled based on the hardware properties (e.g., learned token values by observing transition from memory-bound to compute-bound scenarios), the compute budget (maximum number of tokens that can be verified to avoid a compute-bound scenario), a batch size (number of inputs processed in parallel by the hardware), and context related to the input (e.g., input context length, input complexity, etc.). By dynamically controlling the number of tokens verified, the system maximizes the overall speedup achieved through speculative decoding while minimizing wasted computations.

Improving speculative decoding efficiency while taking into consideration a batch size is beneficial for certain applications, where a system may receive multiple requests (e.g., user inputs from multiple system users) at a time and the system may be configured to process batches/groups of inputs in parallel.

Figure 4:
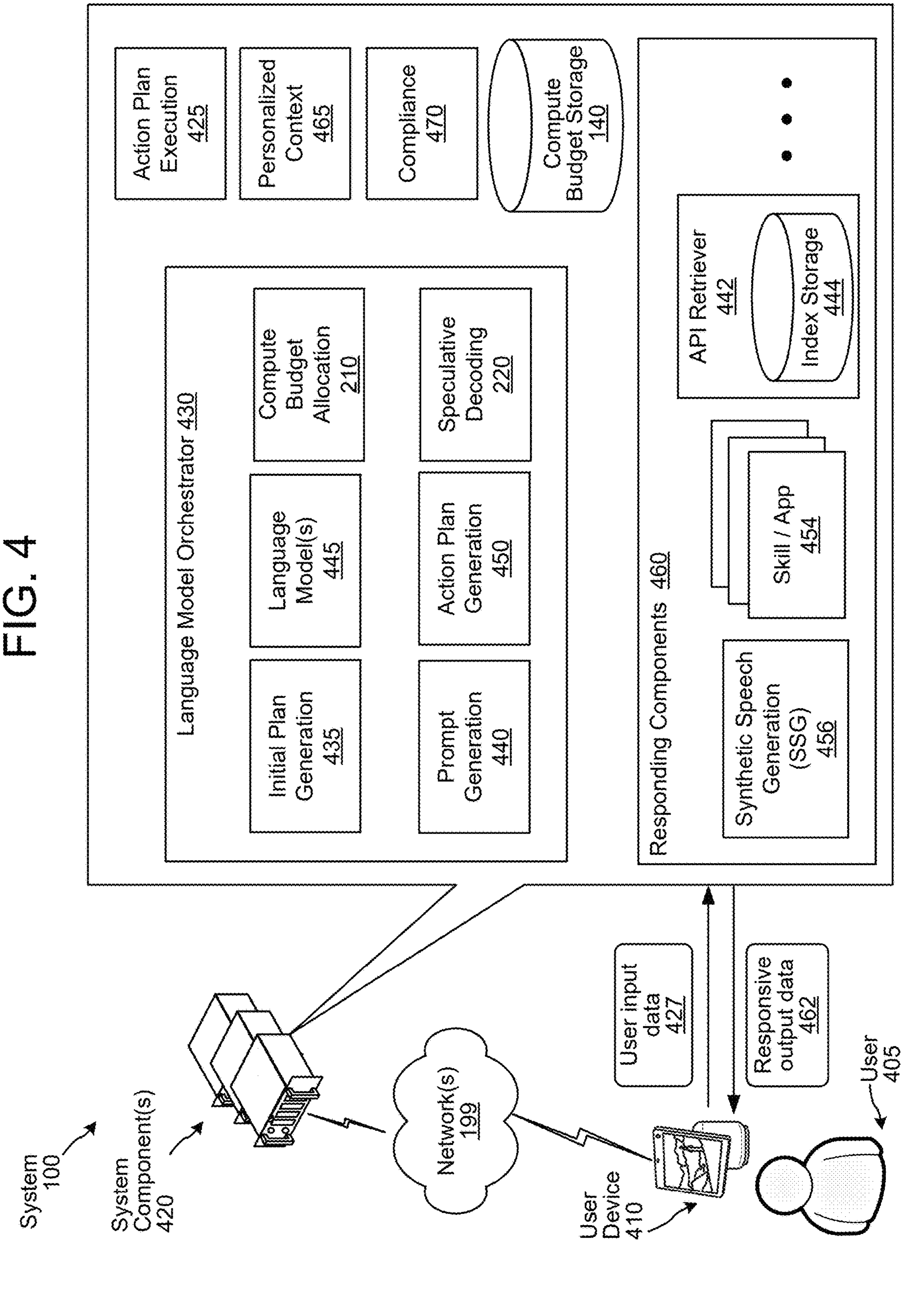
FIG. 4 is a conceptual diagram illustrating example components of a system configured to use a language model to determine a response to a user input, according to embodiments of the present disclosure.

FIG. 4 illustrates further example components included in the system 100 configured to use a language-model based approach to determine an action to be performed in response to a user input and determine a response to be presented to a user 405. As shown in FIG. 4, the system 100 may include a user device 410, local to the user 405, in communication with one or more system component(s) 420 via a network(s) 199. The network(s) 199 may include the Internet and/or any other wide- or local-area network, and may include wired, wireless, and/or cellular network hardware.

In some embodiments, the system component(s) 420 may include various components that may support processing by a language model, such as a language model orchestrator component 430. In example embodiments, the language model orchestrator component 430 may include an initial plan generation component 435, a prompt generation component 440, at least one language model 445, and an action plan generation component 450. The system component(s) 420 may further include an action plan execution component 425 configured to facilitate/cause performance of actions that may be determined by the language model 445. The system component(s) 420 may further include one or more responding components 460 that may perform the actions.

The responding components 460 may be configured to perform an action related to a user input, including, but not limited to retrieving information potentially relevant for determining a response to the user input (e.g., data from a knowledge base, Internet search, database, an application, etc.; context related to the interaction; relevant exemplars for a prompt to the language model; relevant application programming interfaces (APIs); etc.), operating a user device (e.g., a smart home device such as a TV, lights, a kitchen appliance, etc.), determining a synthesized speech output, or other actions described herein. As shown in FIG. 4, the responding components 460 may include an API retriever component 442 (further described below), a synthesized speech generation (SSG) component 456, one or more skill/app components 454 and other components described herein.

APIs are a way for one program/component to interact with another. API calls are a mechanism by which the program/component interact. An API call, or API command, is a message sent to a system component asking an API to perform an action, provide a service or information, or the like. An API call may be formatted for the particular API and may include a particular command, optionally using particular arguments and argument values. API calls may be used for a variety of purposes, such as controlling other devices (e.g., an API call of turn_on_device (device="indoor light 1") corresponds to a command for a component to turn on a device associated with the identifier "indoor light 1"), obtaining information from other components (e.g., an API call of InfoQA.question ("Who is the president of USA?") corresponds to a command for a component to find and provide an answer to the indicated question), and performing other actions (e.g., generating synthesized speech, searching data sources, etc.). The system 100 may interact with the responding components 460 via API calls.

The language model orchestrator component 430 may be configured to orchestrate processing by the language model 445. In some embodiments, the language model 445 may be configured to perform one or more stages of processing, which may be referred to as a task generation stage, an action (or directive) generation stage, and a response generation stage.

The processing stages may be performed in a particular order. For example, during a first stage of processing, the language model 445 may be tasked with performing task generation to generate a list of tasks to be performed in order to respond to a user input. During a second stage of processing, based on the list of tasks, the language model 445 may be tasked with performing action generation to generate action requests (or directives) for a responding component(s) 460 to perform an action(s) related to the tasks/user input. During a third stage of processing, based on information received from the responding component(s) 460, the language model 445 may be tasked with generating a response to the user input and/or causing a component(s) of the system 100 to perform further action(s). Further details are described herein in relation to FIG. 5.

In some cases, a subset of the stages may be performed. For some user inputs, the language model 445 may only perform the task generation stage and the response generation stage, where a response to a user input is generated by the language model 445 using parametric knowledge. For example, for a user input "What kind of fruit is lemon?", the language model 445 may determine that the task is to answer the user's question and may generate a response "Lemon is a citrus fruit that grows on tress" based on the model's parameter knowledge learned during configuration/training operations. In such examples, the language model 445 may not determine an action that is to be performed using a system component, such as sending a request for information to a knowledge base (e.g., the language model 445 may respond without using external knowledge).

In some embodiments, the system may use Retrieval-Augmented Generation (RAG) techniques to inform processing of a language model. RAG techniques may involve referencing an authoritative knowledge base or other type of data source outside of the model's training data sources before generating a response by the model. RAG techniques may extend the already powerful capabilities of language models to specific domains, an organization's internal knowledge base, etc., without the need to retrain the model. In some embodiments, information (e.g., relevant facts, up-to-date information, current/trending topics, etc.) from one or more components (e.g., responding component(s) 460) may be provided to the language model 445 and the model may generate an output based on the received information.

In some embodiments, the language model orchestrator component 430 may be configured to orchestrate processing by multiple different language models, where an individual language model may perform one (or more) of the processing stages described above. For example, a first language model may perform task generation, a second language model may perform action generation, and a third language model may perform response generation. In some embodiments, the language models may be different types of models, for example, a first language model may be a text-to-text generative model, a second language model may be a multi-modal generative model, a third language model may be a text-to-speech generative model, etc. In some embodiments, the language models may be different sizes (e.g., number of parameters), may have different processing capabilities, etc.

In some embodiments, the language model orchestrator 430 may be configured to perform speculative decoding techniques, for example, using at least the speculative decoding component(s) 220, the compute budget allocation component 210 and the compute budget storage 140 as described in relation to FIG. 2. In such embodiments, the language models 445 may include a draft language model configured to generate speculative tokens (similarly to the draft generative model 155 described in relation to FIGS. 1 and 2) and a target language model configured to perform verification and/or decoding steps (similarly to the target generative model 150 described in relation to FIGS. 1 and 2). In such embodiments, the system component(s) 420 (at least the ones shown in FIG. 4) may operate/execute on a hardware system (e.g., the hardware system 105) and a compute budget corresponding to the hardware system may be used to perform speculative decoding. The draft language model may generate speculative tokens corresponding to a potential LM response 546. Although processing shown and described in relation to FIG. 5 does not include the system performing speculative decoding, it should be understood that speculative decoding may be performed as described herein above.

Some embodiments may enable use of other components, such as plugins, with the language model 445, where the plugins may add functionality and features to the language model capabilities. For example, the plugins may be used to perform mathematical calculations (e.g., a calculator plugin), statistical analysis (e.g., a statistics plugin), natural language translation, speech generation, etc. For further example, the plugins may additionally, or alternatively, be used to perform an action responsive to a user input based on the response generated by the language model. As a further example, the plugins may cause the language model to process and output according to an enabled plugin, which may result in a different response, reasoning, processing, etc. from the language model than when the plugin is not enabled. In some cases, a user or a system may enable a plugin(s) for use with the language model.

The system component(s) 420 may include other processing components configured to process user inputs and other type of inputs (e.g., sensor data, audio data, data indicative of an event occurring, etc.) received via the user device 410. In example embodiments, the system component(s) 420 may process spoken inputs using ASR processing. The system component(s) 420 may also be configured to process non-spoken inputs, such as gestures, textual inputs, selection of GUI elements, selection of device buttons, etc. The system component(s) 420 may also include other components to understand an input, determine an action to be performed in response to receiving the input, generate an output responsive to the input, and the like. Such other components may perform natural language processing, SSG processing, etc., some of which are described herein in relation to FIG. 6.

Figure 5:
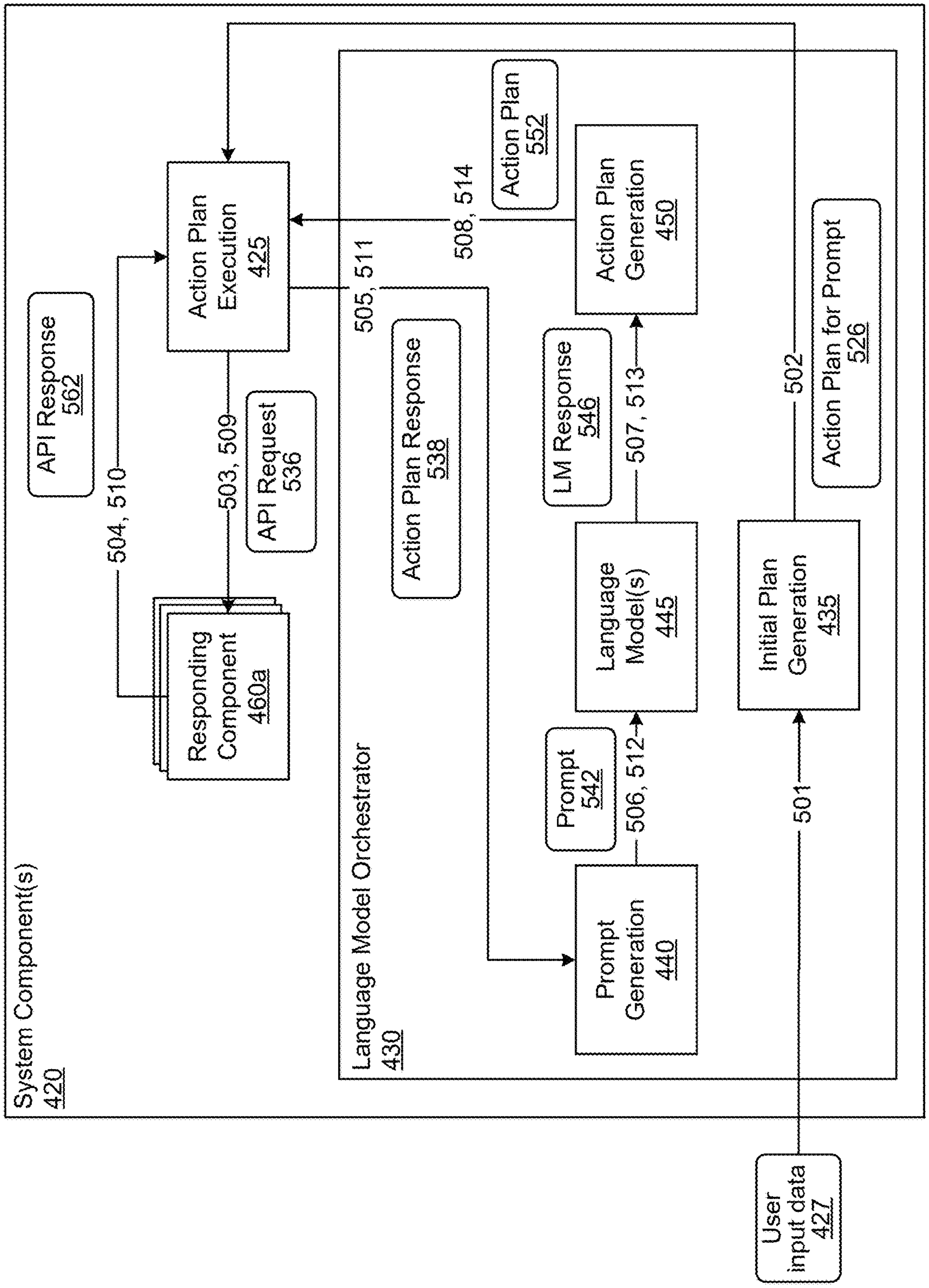
FIG. 5 is a conceptual diagram illustrating example processing of the system configured to use a language model, according to embodiments of the present disclosure.

As shown in FIG. 4, the system component(s) 420 may receive user input data 427, which may be provided to the language model orchestrator component 430 (as shown in FIG. 5). In some instances, the user input data 427 may include one or more types of data, such as text (e.g., a text or tokenized representation of a user input), audio, image, video, etc. Such data may be encoded/embedded data that represent the underlying type of data (e.g., text, audio, image, etc.). For example, the user input data 427 may include text (or tokenized) data when the user input is a natural language user input. In some embodiments, an ASR component 650 of the system 100 may receive audio data representing a spoken natural language user input from the user 405. The ASR component 650 may perform ASR processing on the audio data to determine ASR data representing the spoken user input, which may correspond to a transcript of the user input. As described herein, with respect to FIG. 6, the ASR component 650 may determine ASR data that includes an ASR N-best list including multiple ASR hypotheses and corresponding confidence scores representing what the user may have said. The ASR hypotheses may include text data, token data, ASR confidence score, etc. as representing the input utterance. The confidence score of each ASR hypothesis may indicate the ASR component's 650 level of confidence that the corresponding hypothesis represents what the user said. The ASR component 650 may also determine token scores corresponding to each token/word of the ASR hypothesis, where the token score indicates the ASR component's 650 level of confidence that the respective token/word was spoken by the user. The token scores may be identified as an entity score when the corresponding token relates to an entity. In some instances, the user input data 427 may include a top scoring ASR hypothesis of the ASR data. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 100 may include one or more components configured to process such user inputs to generate the text or tokenized representation of the user input (e.g., the user input data 427). As a further example, the user input data 427 may include image data representing information being displayed at the user device 410 (e.g., on-screen context data) when the user 405 provides the user input or at substantially the same time as the user 405 provides the user input. As yet a further example, the user input data 427 may include audio data representing audio signals (e.g., background noise, audio from other devices such as TV, appliances, etc.) occurring in the environment of the user 405 that can be captured by the user device 410 (e.g., audio environment context). As yet a further example, the user input data 427 may include image data representing one or more objects in the environment of the user 405 (e.g., visual environment context). As yet a further example, the system may receive image data including text (and other data), and the user input data 427 may include text determined from the image data using optical character recognition or other techniques.

In some embodiments, the system component(s) 420 may receive input data that may not be provided directly/explicitly by a user. Such other type of input data may be processed in a similar manner as the user input data 427 as described herein. Such other type of input data may be received in response to detection of an event. Example events include change in a device state (e.g., front door opening, garage door closing, TV turned off, thermostat detecting a particular temperature, etc.), occurrence of an acoustic event (e.g., baby crying, appliance beeping, glass breaking, etc.), presence of a user (e.g., a user approaching the user device 410, a user entering the home, etc.), occurrence of an event indicated by a user (e.g., a reminder/notification requested by the user, sporting event score change, start of a TV program, calendar event, etc.), and others. In some embodiments, the system 100 may process the input data and generate a response/output. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system 100 may include one or more components configured to process the input data to generate a natural language representation of the input data. The system 100, for example, the language model orchestrator component 430 may process the input data and may cause performance of an action. For example, in response to detecting a garage door opening, the system 100 may cause garage lights to turn on, living room lights to turn on, etc. As another example, in response to detecting an oven beeping, the system 100 may cause a user device 410 (e.g., a smartphone, a smart speaker, etc.) to present an alert to the user. The language model orchestrator component 430 may process the input data to generate tasks (e.g., an action plan) that may cause the foregoing example actions to be performed.

FIG. 5 illustrates example processing of the user input data 427 by the system component(s) 420 using the language model 445. Although the figure and discussion of the present disclosure illustrate certain components and steps in a particular order, the components may be implemented in a different manner (as well as certain components removed or added) and the steps described may be performed in a different order (as well as certain steps removed or added) without departing from the present disclosure.

In some embodiments, the language model 445 may perform iterative processing (e.g., multiple processing cycles, multiple processing stages, etc.) with respect to individual user input data 427. Such iterative processing is illustrated and described herein with respect to FIG. 5. For example, in a first iteration of processing the language model 445 may receive a first prompt from the prompt generation component 440, in response to which the language model 445 may determine one or more tasks to be performed with respect to the user input data 427, then at least one of the determined task(s) may be performed via the action plan execution component 425, the results of the performed task(s) may be provided to the language model 445 via a second prompt, in response to which the language model 445 may determine further tasks to be performed or may determine that a (final) response to the user input is determined.

The initial plan generation component 435 may be configured to determine various information relevant to processing of the user input data 427 by the language model orchestrator component 430. The initial plan generation component 435 may generate an action plan (e.g., action plan for prompt data 526) representing one or more tasks/actions to be performed to determine the various relevant information. The relevant information may be included in a prompt to the language model 445. The initial plan generation component 435 may receive (step 501) the user input data 427 representing a user input from the user 405. Based on the user input data 427, the initial plan generation component 435 may determine information relevant for processing the user input data 427 and may output (step 502) the action plan for prompt data 526. The action plan for prompt data 526 may include one or more tasks to be performed to retrieve the relevant information. The tasks may be represented as action descriptions, API requests/calls, API descriptions, requests to a component(s) (e.g., the responding components 460), and the like. Examples tasks that may be included in the action plan for prompt data 526 may relate to obtaining certain information like context data, user profile data, user preferences, available/relevant exemplars, available/relevant APIs, etc.

In example embodiments, the initial plan generation component 435 may determine one or more types of context data relevant for the user input data 427. Types of context data may include user context (e.g., user location, user profile identifier, user demographics, user profile data, user preferences, personalized catalogs, enabled skills/applications, etc.), device context (e.g., device type, device identifier, device location (e.g., living room, kitchen, office, etc.), device capabilities, device state, etc.), environmental context (e.g., time/date the past user input was received/processed, device that received the user input, device that responded to the user input, objects proximate to the device/user, background audio/noises, state/status of device(s) in the user's environment (e.g., TV is on, thermostat temperature, etc.), dialog context (e.g., prior user inputs of a dialog, prior system responses of the dialog, dialog topic, actions performed during the dialog, etc.), and the like. As an example, if the user input data 427 corresponds to operation of a device (e.g., the user input corresponds to a smart home domain), the initial plan generation component 435 may determine that device context information, in particular device states for the devices associated with the user/user profile of the user 405, may be relevant information. As another example, if the user input data 427 corresponds to output of media, such as music, movies, TV shows, etc., the initial plan generation component 435 may determine that user context information, in particular user preference for media genre associated with the user/user profile of the user 405, may be relevant information.

Based on the type of context data determined to be relevant, the initial plan generation component 435 may output the action plan for prompt data 526 to include a request for the type(s) of context data. For example, if device context is relevant information, then the action plan for prompt data 526 may include an API call/description corresponding to a component (e.g., a device state component, a smart home component, a user profile storage, etc.) capable of providing device information. As another example, if user context is relevant information, then the action plan for prompt data 526 may include an API call/description corresponding to a component (e.g., a user profile storage, a personalized context component, etc.) capable of providing user information.

In some embodiments, the initial plan generation component 435 may determine one or more components or types of components that may be relevant for processing the user input data 427. As an example, if the user input data 427 corresponds to operation of a device (e.g., the user input corresponds to a smart home domain), the initial plan generation component 435 may determine that components (e.g., APIs) corresponding to device operation or smart home domain may be relevant, and the initial plan generation component 435 may output the action plan for prompt data 526 to include device operation components or smart home domain components. As another example, if the user input data 427 corresponds to output of media, the initial plan generation component 435 may determine components corresponding to media output or music domain may be relevant, and the initial plan generation component 435 may output the action plan for prompt data 526 to include media output components or music domain components.

In some embodiments, the initial plan generation component 435 may determine a query to retrieve exemplars and/or APIs relevant for processing the user input data 427 using the language model 445. As used herein, an exemplar refers to information that may be included in a prompt to a language model that provides an example of how the language model is to process or respond, including, among other things, what actions the language model can request performance of. A prompt may include more than one exemplar. Few shot learning or in-context learning by the language model is enabled by including the exemplars in the prompt. The query (or request) to retrieve relevant exemplars and/or APIs may be included in the action plan for prompt data 526. The query (or an API request based on the query) may be processed by the responding component 460 (e.g., an exemplar retriever component, the API retriever component 442, etc.). The query, in some embodiments, may include the user input data 427 or a portion or representation thereof.

The initial plan generation component 435 may employ one or more techniques to determine relevant information or to determine the tasks to obtain relevant information. Examples of such techniques include using one or more of machine learning models (e.g., classifiers), statistical models, rules engines, etc. to determine the relevant information. The initial plan generation component 435 may determine a topic/category corresponding to the user input data 427, a (semantically or lexically) similar past user input and relevant information corresponding to the similar past user input, and the like.

In example embodiments, the initial plan generation component 435 may use a language model to determine the types of information relevant for processing the user input data 427. The initial plan generation component 435 may input a prompt to the language model, for example, "What types of information is relevant for responding to the user input: [user input data 427]", and the language model may output one or more types of context data, one or more types of components, etc. that may be relevant. In some embodiments, the initial plan generation component 435 may input a prompt to the language model 445 requesting relevant information for the user input data 427.

The action plan for prompt data 526, which includes types of relevant information for the user input data 427 or tasks to be performed to obtain the relevant information, may be processed by the action plan execution component 425 to retrieve the relevant information. The action plan execution component 425 may process the action plan for prompt data 526 to generate one or more requests to perform an action (e.g., API requests 536) for a particular responding component 460. For example, if the action plan for prompt data 526 indicates that device information/context is relevant, then the action plan execution component 425 may generate an API request 536 for a responding component 460*a* capable of providing the device information, where the API request 536 may include a user profile identifier associated with the user 405, a device identifier associated with the user device 410, and/or other information based on information required in the API call for the responding component 460*a*.

The API request 536 may be sent (step 503) to the corresponding responding component(s) 460. The responding component(s) 460 may include components that the action plan execution component 425 may communicate with via API requests or other type requests. As shown in FIG. 4, the responding component(s) 460 may include one or more skill/app components 454, the SSG component 456 (e.g., configured to convert input data to audio data representing synthesized speech), and the API retriever 442 (e.g., configured to provide APIs and corresponding information supported by the system 100). The responding component(s) 460 may also include an orchestrator component 630 (e.g., configured to facilitate processing by other system components 420 such as those shown in FIG. 6), a context source component (e.g., configured to provide user context data, device context data, environmental context data, dialog context data, personalized context data, etc.), a multimodal response component (e.g., configured to respond to a user input via outputs in more than one data form), a content moderation component (e.g., configured to moderate certain types of content such as biased content, harmful content, offensive content, etc.), a smart home devices component (e.g., configured to provide device information such as device state, device capabilities, etc.), a language model-based agent (e.g., a component that uses a language model (e.g., a LLM) or other type of generative model to provide information), an exemplar provider component (e.g., configured to respond to a query for relevant exemplars), a knowledge base component (e.g., including one or more knowledge bases or other structured data that can be searched to obtain information), an entity resolution component (e.g., configured to determine specific entities corresponding to entities represented in a user input or language model output), and the like.

In response to receiving the API request 536 (at step 503), the responding component(s) 460 may provide (step 504) an API response(s) 562 to the action plan execution component 425. At step 503, the API request(s) 536 is based on the action plan for prompt data 526, and thus, at step 504, the API response(s) 562 may include information relevant for processing the user input data 427. In examples, the API response(s) 562 may include relevant context information (e.g., device context, user context, environment context, dialog context, personalized context, etc.), relevant APIs and/or API descriptions for processing the user input data (e.g., API(s) for operating devices, API(s) for outputting media content, etc.), relevant exemplars, and other relevant information requested via the action plan for prompt data 526.

In example embodiments, the API request 536 may be sent to the API retriever component 442. In such cases, the API request 536 may include a query to retrieve relevant APIs based on the user input data 427. The API retriever component 442 may be configured to receive a search query and output one or more APIs or API data corresponding to (e.g., satisfying, matching, etc.) the search query. API data may include an API call, an API description, and other information associated with the API. In some embodiments, the API retriever component 442 may include or may be in communication with an index storage 444 (shown in FIG. 4). The index storage 444 may store various information associated with multiple APIs. Examples of information stored in the index storage 444 include: API/component descriptions (e.g., a description of one or more function that the API can be used to perform), API arguments (e.g., parameter inputs, input types, examples of input values, examples of output values, output type, etc.), identifiers for components corresponding to the API (e.g., alphanumerical component ID, component name, etc.), and other information. In some embodiments, the index storage 444 may include other information associated with the API, such as historical accuracy/defect rate, historical latency value, feedback (e.g., user satisfaction/feedback, system-based feedback), etc. The index storage 444 may also include sample user inputs corresponding to the API, where the sample user input may represent a user input for which the API can perform an action for.

The API retriever component 442 may apply one or more retrieval techniques to determine API data corresponding to the search query. For example, the API retriever component 442 may compare one or more APIs included/represented in the index storage 444 to the user input data 427 represented in the search query to determine one or more APIs (top-k list). Such comparison may involve a semantic comparison between the user input data 427 and the API data. In some embodiments, the API retriever component 442 may use a neural-based retrieval technique that may involve determining an encoded representation of the user input/search query and comparing (e.g., using cosine distance) the encoded representation(s) of the API data in the index storage 444. The relevant APIs may be included in the API response 562.

In a non-limiting example, for a user input "book a flight", the API retriever component 442 may determine one or more API calls corresponding to booking a flight (e.g., Bookflight.location ("departing airport code", "arrival airport code"), Bookflight.date ("departing date"), bookflight-.rountrip ("departing location", "arrival location", "departure date", "return date"), AirlineBookFlight ("departing airport code", "arrival airport code"), etc.).

Some embodiments may include an exemplar provider component that may operate in a similar manner as the API retriever component 442 in terms of implementing one or more retrieval techniques to determine exemplars corresponding to (e.g., satisfying, matching, etc.) a search query based on the user input data 427. The exemplar provider component may search an index storage including various information related to multiple different exemplars. In some embodiments, the index storage may include sample user inputs associated with an exemplar, and the relevant exemplars may be retrieved based on a comparison of the sample user inputs and the user input data 427. The retrieved exemplars may be included in the API response 562.

The information from the API response(s) 562 may be included in a prompt to the language model 445. The action plan execution component 425 may determine action plan response data 538 based on the API response(s) 562. The action plan execution component 425 may combine (e.g., aggregate, summarize, de-duplicate, etc.) multiple API responses 562 to generate the action plan response data 538. In some examples, the action plan response data 538 may be the same or similar to the API response(s) 562. The action plan execution component 425 may send (step 505) the action plan response data 538 to the prompt generation component 440.

Using the action plan response data 538, the prompt generation component 440 may determine prompt 542 for the language model 445. The prompt 542 may be a natural language input (e.g., a natural language request, a natural language instruction, etc.). In some embodiments, the prompt 542 may include information in a manner that the language model 445 is trained for. The prompt generation component 440 may send (step 506) the prompt 542 to the language model 445, where the prompt 542 may include the user input data 427 (or a representation of the user input data 427) and the relevant information for processing the user input data 427. For example, the prompt 542 (at step 506) may include relevant context data, relevant APIs or API descriptions, etc. that may be included in the action plan response data 538. In some embodiments, the prompt 542 may include a request or directive for the language model 445 to respond to the user input data 427. In some embodiments, the prompt 542 may include one or more exemplars (e.g., in-context learning examples) for processing the user input data 427.

The prompt 542 may include indicators (e.g., labels, specific tokens, etc.) to identify certain information. In example embodiments, the prompt 542 may include a "User" indicator (to indicate that the following string of characters/tokens are the user input), an "Exemplar" indicator (to indicate exemplars), and so on.

In some embodiments, the prompts for the language model described herein may include a request for the language model to output a response that satisfies certain conditions. Such conditions may relate to generating a response that is unbiased (toward protected classes, such as gender, race, age, etc.), non-harmful, profanity-free, etc. For example, prompt data generated by a prompt generation component described herein may include "Please generate a polite, respectful, and safe response and one that does not violate protected class policy."

In some embodiments, the prompt 542 may include an indication the processing stages (e.g., the task generation stage, the action generation stage, and the response generation stage) that the language model 445 is to perform. In some examples, for the task generation stage, the prompt 542 may direct the language model 445 to generate an output (e.g., tokens) representing the model's interpretation of the user input and/or one or more tasks to be performed to respond to the user input (the model output may be, for example, the user is requesting [intent of the user input], the user wants to [desired user action], need to determine [information needed to properly process the user input], etc.). For the task generation stage, the prompt 542 may also direct the language model 445 to prioritize a list of tasks to be performed, if more than one task is to be performed and select one (or more) task for the current iteration of processing.

In some examples, for the action generation stage, the prompt 542 may direct the language model 445 to generate an output (e.g. tokens) representing an action(s) (or directive(s)) and/or an API call(s) corresponding to the user input, where performance of the action(s) or execution of the API(s) can be done to retrieve information to determine a response to the user's input, perform the user requested action, retrieve information/data to perform other tasks on the task list, etc. In some examples, for the action generation stage, the prompt 542 may direct the language model 445 to process the results of the action(s)/API(s) determined by the language model 445, and to determine whether a response to the user input can be generated or whether there are further tasks to be performed from the task list.

In some examples, for the response generation stage, the prompt 542 may direct the language model 445 to generate an output (e.g., tokens) representing a response (e.g., a final response) to the user input data 427. In examples, the language model 445 may be directed to generate the response based on the results of performing the action(s)/API(s).

The prompt generation component 440 may send (step 506) the prompt 542 to the language model 445, which may process the prompt 542 to generate a language model (LM) response 546. The LM response 546 may be a natural language output generated based on the prompt 542. The LM response 546 may include text tokens. In other embodiments, where the language model 445 may be a multi-modal model, the LM response 546 may include other types of tokens, for example, audio tokens, image tokens, etc.

Based on receiving the prompt 542 at step 506, the language model 445 may generate the LM response 546 at step 507, where the instant LM response 546 may include outputs corresponding to the task generation stage and the action generation stage. The LM response 546 may include an action for determining information relevant to or responsive to the user input data 427. For example, the LM response 546 may include an action to search a knowledge base (e.g., to find a response to a user question), an action to determine information from a particular skill/app or language model-based agent (e.g., to determine current weather information, to determine a cost of an item, to book travel, etc.), an action to operate a device (e.g., turn on lights, set thermostat to a particular temperature, etc.), an action to request information from the user 405, etc.

In some embodiments, the LM response 546 may include an API or API description corresponding to the determined action. For example, the LM response 546 may include an API to operate a device or an API call(s) to output media content. The language model 445 may determine the actions and/or the API information based on the relevant APIs included in the prompt 542. The language model 445 may generate actions and/or API information that is not based on (e.g., correspond to, is similar to, etc.) the relevant APIs included in the prompt 542 (for example, the language model 445 may generate incorrect/unsupported actions and/or API information).

The LM response 546 may follow the format included in the prompt 542 or that the language model 445 is trained to follow. An example prompt 542 may be:

{
Please process the following user input and context data to determine at least one action or API to execute and generate a response to the user.
First determine a task to perform (use "Task" label), then determine an API to perform the task (use "Action" label), then process the results from the API, and then generate a response to the user input (use "Response" label). You may determine multiple tasks to perform. You may have to process iteratively.
User: Turn on living room TV
Available context:
User devices: "living room TV"=[device id] "living room TV" device state=Off
Available APIs:
TurnOn.device (device)
Turn VolumeUp.device (device)
SetTVChannel (device, input channel)
}

Based on processing the above example prompt 542, an example LM response 546 (at step 507) may be:

{
Task: User wants to turn on living room TV that is operation of a user device.
Action: I need an API to operate a device. TurnOn.device (device="living room TV")
}

The LM response 546 may be sent (step 507) to the action plan generation component 450, which may determine action plan data 552. As described herein, the language model 445 may generate tokens in sequence, as such, the language model 445 may generate portions of the LM response 546 in a tokens-by-tokens basis. In some embodiments, the LM response 546 may be processed by the action plan generation component 450 based on the language model 445 generating the tokens representing the action or corresponding to the action generation stage.

The action plan generation component 450 may process the LM response 546 to identify one or more actions/APIs generated by the language model 445. In examples, the action plan generation component 450 may parse the tokens/text included in the LM response 546 to extract tokens/text representing an action or API. In some embodiments, the action plan generation component 450 may be configured to determine one or more components (e.g., responding components 460*a-n*) configured to perform the identified action or API. Based on the LM response 546, the action plan generation component 450 may determine the action plan data 552, which may in turn cause performance of an action (e.g., execution of API calls) to determine a potential response(s) to the user input. The action plan data 552 may include one or more APIs to be executed, where the APIs may be determined based on (e.g., extracted from) the LM response 546. For example, if the LM response 546 includes an action of "determine weather forecast for today" or an API call of "GetWeather.location ([city])", then the action plan generation component 450 may determine the action plan data 552 to include an API call "GetWeather.location ([city])" and include an identifier for the responding component(s) 460*a* (e.g., a weather skill component). Instead of or in addition to an API call, the action plan data 552 may include a request to perform an action, an API description, etc. In some embodiments, the action plan generation component 450 may determine the responding components 460 based on user permissions, subscriptions, authorization or other use-enabling information associated with the user 405 (e.g., included in user profile data).

In some embodiments, the action plan generation component 450 may be configured to determine more than one responding component 460 to perform the action/execute the API indicated in the LM response 546. In some embodiments, the action plan generation component 450 may determine APIs corresponding to multiple responding components 460. For example, for the "GetWeather.location ([city])" API, the action plan data 552 may include an identifier for a first weather skill component, an identifier for a second weather skill component, an identifier for a search engine component, etc.

The action plan data 552 may be sent (step 508) to the action plan execution component 425. The action plan execution component 425 may identify the APIs in the action plan data 552 and generate executable API calls for the corresponding responding components 460. Based on the action plan data (received at step 508), the action plan execution component 425 may generate an additional (a second) API request (or multiple API requests) 536. The (additional/second) API request(s) 536 may be sent (step 509) to the responding component(s) 460. For example, the action plan execution component 425 may send a first API call to a first responding component 460*a* and a second API call to a second responding component 460*b*.

In some cases, the action plan data 552 may include incomplete API calls and the action plan execution component 425 may be configured to generate executable API calls (e.g., complete API calls) corresponding to the action plan data 552.

The action plan execution component 425 may generate one or more executable API calls including one or more parameters using information included in the action plan data 552 and/or various other contextual information (e.g., speaker recognition results, a user ID, user profile information (e.g., age, gender, location, language, geographic marketplace, etc.), device ID, device profile information, device state indicators, a dialog history, and/or a interaction history associated with the user and/or the device, etc.). In some embodiments, the various contextual information may be contextual information not provided to the language model orchestrator component 430. Prior to generating the executable commands, the action plan execution component 425 may modify (e.g., remove, filter, preempt, etc.) a directive included in the action plan data 552 that is determined to be in conflict with a system operating policy. The action plan execution component 425 may generate one or more additional executable commands corresponding to directives not included in the action plan data 552.

In response to receiving the API request(s) 536 (at step 509), the responding component(s) 460 may send (step 510) an (additional/second) API response(s) 562 to the action plan execution component 425. The action plan execution component 425 may determine (additional/second) action plan response data 538 based on the (additional/second) API response(s) 562. The action plan execution component 425 may combine (e.g., aggregate, summarize, de-duplicate, etc.) multiple API responses 562 to generate the action plan response data 538. In some examples, the action plan response data 538 may be the same or similar to the API response(s) 562. In some examples, the action plan response data 538 may include an identifier associated with the responding component 460 that provided the API response 562. For example, the (additional/second) action plan response data 538 may include first weather information from a first weather skill component, second weather information from a second weather skill component, third weather information from a search engine component, etc. In some embodiments, the action plan execution component 425 may remove/filter information from the API response 562 that is determined to include information not beneficial to the processing by the language model 445.

The action plan execution component 425 may send (step 511) the (additional/second) action plan response data 538 to the prompt generation component 440. The information from the API response(s) 562 may be included, by the prompt generation component 440, in a (additional/second) prompt to the language model 445. The prompt generation component 440 may generate the second prompt 542 to include the action plan response data 538 or a representation thereof. The second prompt 542 may also include information from the prior/first prompt (from step 506). For example, the second prompt 542 may include the user input data 427 (or a representation thereof), the relevant information for processing the user input data 427 (e.g., relevant context data, relevant API information, relevant exemplars, etc.), the processing stages information, and the action plan response data 538 (from step 511). In some embodiments, the second prompt 542 may also include at least a portion of the LM response 546 generated during a prior iteration of processing (e.g., the outputs based on performing the task generation stage and the action generation stage) to indicate actions/results of the prior iteration of processing by the language model 445. The second prompt 542 may include an indicator (e.g., label, identifier, etc.) associated with the action plan response data 538 to indicate, to the language model 445, that the string of characters/tokens following the indicator represent information determined based on performance of the actions determined during the action generation stage.

The second prompt 542 may be sent (step 512) to the language model 445 for processing. At this point, the language model 445 may perform the action generation stage of processing the results of the performed actions, which may involve interpreting or understanding the results included in the action plan response data 538. The language model 445 may generate (step 513) a (additional/second) LM response 546 based on the second prompt 542. The second prompt 542 may include a request or directive to the language model 445 to perform further processing with respect to the user input data 427. As described above, the second prompt 542 may provide, among other things, responses/results of performance of the action determined by the language model 445 determined during the prior iteration of processing. The language model 445 may generate further actions to be performed to respond to the user input data 427 (as part of the action generation stage) or may generate a (final/user-facing) response to the user input data 427 (as part of the response generation stage).

An example second prompt 542 may be:

{

Please process the following user input and context data to determine at least one action or API to execute and generate a response to the user.

First determine a task to perform (use "Task" label), then determine an API to perform the task (use "Action" label), then process the results from the API, and then generate a response to the user input (use "Response" label). You may determine multiple tasks to perform. You may have to process iteratively.

User: Turn on living room TV

Available context:

User devices: "living room TV"=[device id] "living room TV" device state=Off

Available APIs:

TurnOn.device (device)

Turn Volume Up.device (device)

SetTVChannel (device, input channel)

Prior Iteration:

Action: TurnOn.device (device="living room TV")

TurnOn.device (device="living room TV"); API response: "living room TV" device state=ON

}

Based on the above example prompt 542, an example LM response 546 may be:

{

Task: User wants to turn on living room TV that is operation of a user device.

Action: I need an API to operate a device. TurnOn.device (device="living room TV")

Action result is "living room TV" device state=ON

Response: The living room TV is on now. Can I help you with anything else?

}

As described herein, the language model 445 may generate the LM response 546 on tokens-by-tokens basis. As such, in some examples, the second LM response 546 may include additional tokens (e.g., newly generated tokens) to the first LM response 546 (from step 507). In other examples, the second LM response 546 may include different tokens than the first LM response 546, where the currently generated tokens may represent outputs for further steps of the action generation stage and/or the response generation stage.

The language model 445 may determine further actions/APIs to be performed in a similar manner as described above. Such further actions/APIs may be based on any tasks, included in the task list generated during the task generation stage, that are still to be performed (e.g., a first task of booking a flight may be done, now a second task of booking a hotel is to be performed). Additionally or alternatively, the further actions/APIs may be based on the results included in the action plan response data 538 (at step 511) (e.g., an API response from a responding component 460 may indicate that additional information is needed to perform an action).

The language model 445 may determine a (final) response to the user input, where the response is to be presented to the user 405 via the user device 410. In other cases, the response may be presented via another user device 410 associated with the user 405. The language model 445 may determine the final response based on the results included in the action plan response data 538 (from step 511). For example, the language model 445 may summarize the results, may combine the results, may generate an interpretation of the results, etc. In a non-limiting example, the language model 445 may combine weather information from two or more responding components (e.g., combine high/low temperature information from a first responding component with humidity information from a second responding component). In another non-limiting example, the language model 445 may interpret results from a knowledge base component to determine a response to the specific user query (e.g., from a biographical search result for a historical person, a birthplace and siblings information may be extracted to determine a response to a user query "tell me about [person's] childhood").

In some examples, the language model 445 may generate the further action to be performed is requesting additional information from the user 405. Such further action, in some embodiments, may be labeled as "Response" so that the action plan generation component 450 may cause a request to be output to the user 405.

The second LM response 546 may be sent (step 513) to the action plan generation component 450, which may determine (step 514) the (additional/second) action plan data 552. In some examples, the second LM response 546 sent to the action plan generation component 450 may include further action(s)/API(s) to be executed, which may be labeled with "Action." In some examples, the second LM response 546 may include a final response to the user input, which may be labeled with "Response."

Based on the tokens corresponding to the "Action" label, the action plan generation component 450 may determine the action plan data 552 to include one or more actions, one or more API calls and/or one or more responding components 460 corresponding to the action(s)/API(s) determined by the language model 445.

Based on the tokens corresponding to the "Response" label, the action plan generation component 450 may determine the action plan data 552 to include one or more actions, one or more API calls and/or one or more responding components 460 to present the output tokens to the user 405 as a response to the user input. For example, the action plan data 552 may include an identifier for the SSG component 456 to cause the output tokens, generated by the language model 445, to be presented as synthesized speech. As another example, the action plan data 552 may include an identifier for the responding component 460 capable of generating outputs in more than one form (e.g., a multi-modal output component) to cause the tokens to be presented as synthesized speech, displayed text/graphics, and/or other types of outputs.

The (second) action plan data 552 may be sent (step 514) to the action plan execution component 425, and as described herein, the action plan execution component 425 may determine executable API calls based on the action plan data 552. If the action plan data 552 represents additional actions to be performed, then the action plan execution component 425 may cause the corresponding responding component(s) 460 to perform the additional action(s) and corresponding response(s) (e.g., API responses 562) may be communicated to the prompt generation component 440 (via the action plan execution component 425 and action plan response data 538) to initiate another iteration of processing by the language model 445 with respect to the user input data 427. If the action plan data 552 represents a response to be presented to the user 405, then the action plan execution component 425 may cause the corresponding responding component(s) 460 to determine output data (e.g., responsive output data 462 shown in FIG. 4) that may be presented via the user device 410. For example, the responsive output data 462 may be sent to the user device 410 via the orchestrator component 630 or another system component(s) 420 (described in relation to FIG. 6).

In some embodiments, when further actions are generated by the language model 445 to be performed with respect to the user input data 427, the language model orchestrator 430 may perform another iteration of processing, which may involve generating another prompt 542 to the language model 445, generating another LM response 546 that may be used to determine further action plan data 552. The language model 445 may generate tokens corresponding to the action generation stage and/or the response generation stage during the further iteration.

In some embodiments, when a final response is generated by the language model 445, further processing with respect to the user input data 427 by the language model orchestrator 430 may be ceased (e.g., processing with respect to the user input data 427 by the language model orchestrator 430 may be complete). The language model orchestrator 430 may process with respect to a subsequently received user input, which may or may not be part of the same dialog session as the prior/already processed user input data 427.

The responsive output data 462 may include one or more of output audio data representing synthesized speech, text data for display, image for display, graphics/icons for display, media (e.g., video, music, background music, notification sounds, etc.) for playback, and other data. In some embodiments, the responsive output data 462 may include placement information representing where (e.g., top banner, left portion, center of screen, overlay on current visual, etc.) on the display screen of the user device 410 the output data is to be displayed. In some embodiments, the responsive output data 462 may be determined/provided by the responding component 460. In some embodiments, another system component 420 may process the responsive output data 462 prior to sending to the user device 410 to ensure that the responsive output data is formatted for the particular user device 410.

Referring again to FIG. 4, as shown, the system component(s) 420 may include a compliance component 470. In some embodiments, the compliance component 470 may be included in the language model orchestrator component 430. In other embodiments, the compliance component 470 may be one of the responding components 460 and the action plan generation component 450 may cause the action plan execution component 425 to send an API request to the compliance component 470 when processing by the compliance component 470 is to be performed.

The compliance component 470 may be configured to determine whether an output of the language model 445 is appropriate for output to the user 405. In some embodiments, the compliance component 470 may be configured to process language model output (e.g., the LM response 546) representing outputs/tokens generated by the language model 445 during processing of the user input data 427. The model output may include tokens generated during the task generation stage, the action generation stage or the response generation stage. The compliance component 470 may also or instead determine whether an input to the language model 445 (e.g., a user request, an output of another system component of the system 100) is appropriate and/or that the input will result in the language model 445 generating an output that is appropriate to present to the user 405. For this determination, the compliance component 470 may process the user input data 427 or a portion or representation thereof. In some embodiments, the compliance component 470 may process other data (e.g., context data, user profile data, system configuration/policy data, etc.) to determine whether the generated response and/or the input is appropriate.

In some embodiments, the compliance component 470 may determine whether the model output/LM response 546 and/or the user input data 427 corresponds to training data used to configure the language model 445 (e.g., the model output or user input is semantically or lexically similar to the training data, the model output or user input corresponds to functionality (e.g., topics, categories, actions, etc.) that the model is trained for, etc.). Additionally or alternatively, the compliance component 470 may determine whether the model output/LM response 546 and/or the user input data 427 corresponds to one or more words or phrases determined to be confidential, sensitive, or offensive. Additionally or alternatively, the compliance component 470 may determine whether the user input or the model output corresponds to an inappropriate content category, which may include biased content (e.g., biased toward protected classes including gender, race, age, etc.), harmful content (e.g., violent content, self-harm, etc.), profanity, etc.

In some embodiments, the compliance component 470 may use one or more techniques to determine whether the model output or the user input is appropriate; such techniques may include a rules-engine, a word-based similarity determination, a machine learning model based determination (e.g., using a classifier to classify model output or user input to appropriate category or inappropriate category), etc.

In some embodiments, the compliance component 470 may process the user input data 427 when it is received by the language model orchestrator component 430 and in some cases may process in parallel to the language model orchestrator component 430. In some embodiments, the compliance component 470 may process the model output as the language model 445 generates the output tokens. In other embodiments, the compliance component 470 may process the model output after the language model 445 has generated tokens for a particular processing stage (e.g., after the task generation stage is completed, after the action generation stage is completed, after the response generation stage is completed, etc.).

If the compliance component 470 determines that the model output or the user input data 427 is appropriate, then the language model orchestrator component 430 may continue processing with respect to the user input data 427. If the compliance component 470 determines that the model output is not appropriate, then one or more remedial actions may be performed. One example remedial action may involve prompting the language model 445 to generate a new/modified model output. In such examples, additional prompt data may be determined, which may include the original prompt data, the initial model output, and an indication that the initial model output is not appropriate for output to the user 405. The additional prompt data may include a request or directive to the language model 445 to generate model output that is appropriate for output to the user 405. Another example remedial action may involve the system outputting a generic/template response (e.g., "Sorry, I can't help you with that" or "I cannot answer questions for [inappropriate category])") or a request for a rephrased input (e.g., "can you rephrase that").

In some embodiments, the compliance component 470 may cause the system to output a response indicating where (e.g., a source external to the system components 420) the included/outputted information may be found. For example, the response may include an indication of a source of the training data or the data (e.g., API response 562) that the response is based on (e.g., the indication may include a description of an owner of the intellectual property rights corresponding to the training data/the response information, a hyperlink to the source, etc.). In some embodiments the compliance component 470 may determine that the model generated response is based on (e.g., summarizing, using, similar to, etc.) data that protected by intellectual property rights (or other laws), and instead of outputting the language model generated response (e.g., LM response 546). In some embodiments the responsive output data 462 may include an indication of the intellectual property rights owner, may include access to a source of the data (e.g., website link), or may include a template response (e.g., "I cannot process this request" or "The requested data is protected by intellectual property rights", etc.). In some embodiments, the compliance component 470 may determine that the user input data 427 involves processing data or outputting data that is protected by certain intellectual property rights (or other laws). An example of such a user input may be "write a story about [protected character]" or "draw an image of [protected character] doing [some action]", where the owner of intellectual property rights in the [protected character] may not allow use, copying, or other operations. In response, the system may cease or prevent processing by the language model orchestrator 430 of the user input data 427, and the system may output a template response (e.g., "I cannot process this request" or "The requested data is protected by intellectual property rights", etc.).

As shown in FIG. 4, the system component(s) 420 may include a personalized context component 465. In some embodiments, the personalized context component 465 may be included in the language model orchestrator component 430. In other embodiments, the personalized context component 465 may be one of the responding components 460 and the action plan generation component 450 may cause the action plan execution component 425 to send an API request to the personalized context component 465.

The personalized context component 465 may be configured to determine personalized context data including context data corresponding to the user input data 427 and/or the user 405. In some embodiments, the initial plan generation component 435 may request personalized context data to include in the prompt 542. In other embodiments, other system component(s) 420, such as the language model 445, may request personalized context data (e.g., to determine a personalized response to a user input). The personalized context data may include user preferences, past user inputs, past system outputs for past user inputs from the user 405, past skill/app usage, user-defined items, etc. The personalized context component 465 may infer user preferences from user-provided preferences, past user interactions by the user 405, information related to users similar to the user 405, etc. In some embodiments, the personalized context component 465 may employ one or more techniques to determine the personalized context data; such techniques may include using a rules-engine, using one or more machine learning models (including a generative model), topic determination techniques, neural retrieval search techniques, etc.

In examples, the personalized context component 465 may receive the user input data 427, task data representing a current task being performed/processed, and/or model output indicating that an ambiguity exists or additional information is needed to generate a response to the user input. The personalized context component 465 may receive a query in some examples, which may include an identifier for the user 405. In a non-limiting example, the personalized context component 465 may receive the following example requests: "Does the user prefer to use [Music Service 1] or [Music Service 2] for playing music," or "What kind of music does the user like?" The personalized context component 465 determine example personalized context data including "The user prefers [Music Service 1]" or "The user likes [music genre]").

Figure 6:
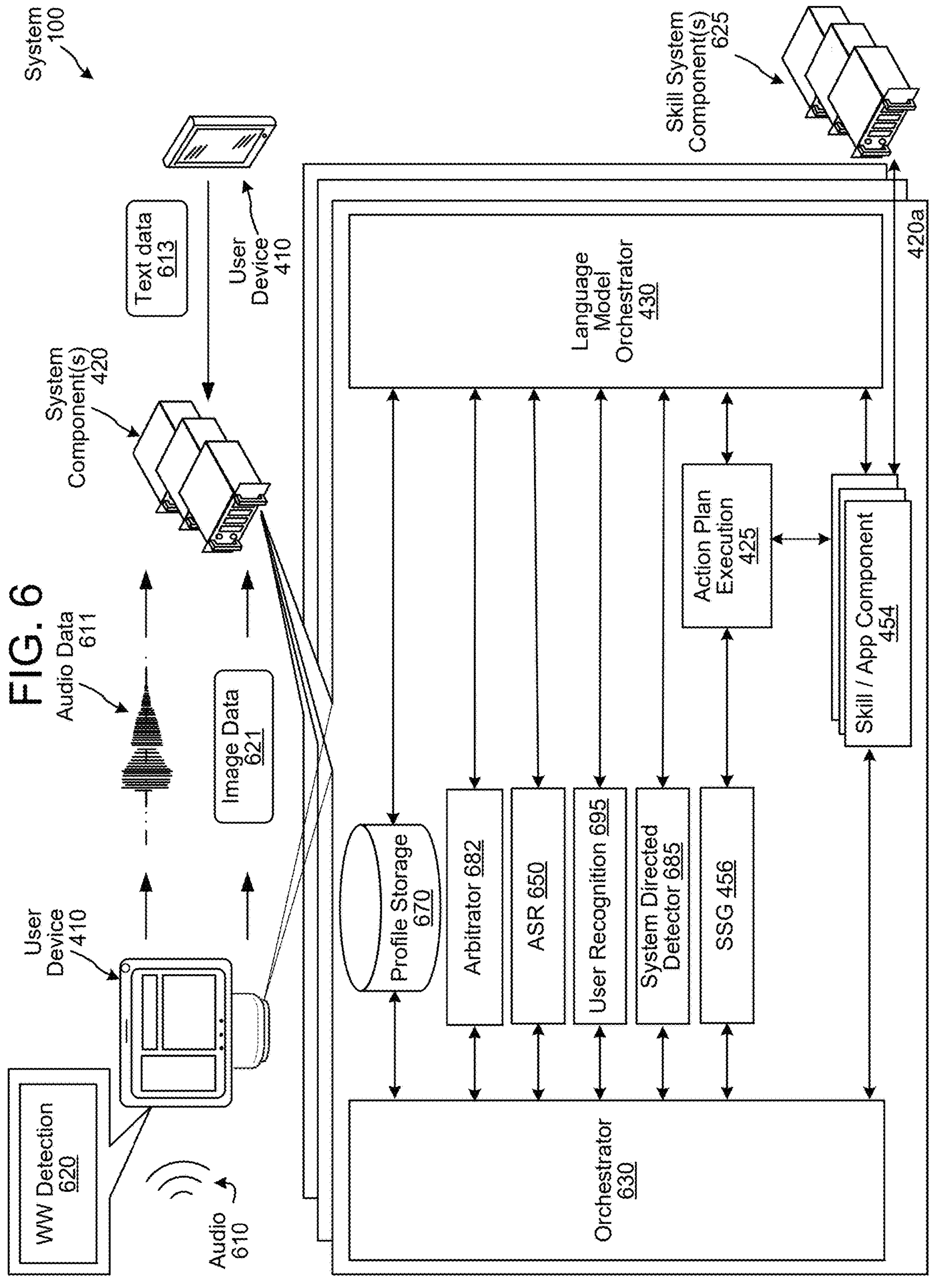
FIG. 6 is a conceptual diagram illustrating example components of the system, according to embodiments of the present disclosure.

Further information related to the SSG component 456 and the skill/app component 454 is described herein in relation to FIG. 6.

In some embodiments, the language model 445 may be fine-tuned to perform a particular task(s). Fine-tuning of the language model(s) may be performed using one or more techniques. One example fine-tuning technique is transfer learning that involves reusing a pre-trained model's weights and architecture for a new task. The pre-trained model may be trained on a large, general dataset, and the transfer learning approach allows for efficient and effective adaptation to specific tasks. Another example fine-tuning technique is sequential fine-tuning where a pre-trained model is fine-tuned on multiple related tasks sequentially. This allows the model to learn more nuanced and complex language patterns across different tasks, leading to better generalization and performance. Yet another fine-tuning technique is task-specific fine-tuning where the pre-trained model is fine-tuned on a specific task using a task-specific dataset. Yet another fine-tuning technique is multi-task learning where the pre-trained model is fine-tuned on multiple tasks simultaneously. This approach enables the model to learn and leverage the shared representations across different tasks, leading to better generalization and performance. Yet another fine-tuning technique is adapter training that involves training lightweight modules that are plugged into the pre-trained model, allowing for fine-tuning on a specific task without affecting the original model's performance on other tasks. Some techniques may involve supervised fine-tuning (SFT), unsupervised fine-tuning, semi-supervised fine-tuning, or other types of learning.

In some embodiments, one or more of the system components 420 described herein may be configured to begin processing with respect to data as soon as the data or a portion of the data is available to the components (e.g., processing in a streaming fashion). Some system components may be generative components/models that can begin processing with respect to portions of data as they are available, instead of waiting to initiate processing after the entirety of data is available. For example, the language model 445 may start processing a first portion of the prompt 542 while the prompt generation component 440 determines a second/subsequent portion of the prompt 542. As another example, the action plan generation component 450 may start processing a first portion of the LM response 546 while the language model 445 is generating a second/subsequent portion of the LM response 546.

The system 100 may operate using various components as described in FIG. 6. The various components may be located on same or different physical devices. Communication between various components may occur directly or across a network(s) 199. The user device 410 may include audio capture component(s), such as a microphone or array of microphones of a user device 410, captures audio 610 and creates corresponding audio data. Once speech is detected in audio data representing the audio 610, the user device 410 may determine if the speech is directed at the user device 410/system component(s). In at least some embodiments, such determination may be made using a wakeword detection component 620. The wakeword detection component 620 may be configured to detect various wakewords. In at least some examples, each wakeword may correspond to a name of a different digital assistant. An example wakeword/digital assistant name is "Alexa." In another example, input to the system may be in form of text data 613, for example as a result of a user typing an input into a user interface of user device 410. Other input forms may include indication that the user has pressed a physical or virtual button on user device 410, the user has made a gesture, etc. The user device 410 may also capture images using camera(s) of the user device 410 and may send image data 621 representing those image(s) to the system component(s). The image data 621 may include raw image data or image data processed by the user device 410 before sending to the system component(s). The image data 621 may be used in various manners by different components of the system to perform operations such as determining whether a user is directing an utterance to the system, interpreting a user command, responding to a user command, etc. In some embodiments, the user input data 427 (described in relation to FIG. 4) may include one or more the audio 610, the audio data 611, the text data 613 and the image data 621.

The wakeword detection component 620 of the user device 410 may process the audio data, representing the audio 610, to determine whether speech is represented therein. The user device 410 may use various techniques to determine whether the audio data includes speech. In some examples, the user device 410 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 410 may implement a classifier configured to distinguish speech from background noise. The classifier may be implemented by techniques such as linear classifiers, support vector machines, and decision trees. In still other examples, the user device 410 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 610, is analyzed to determine if specific characteristics of the audio data match preconfigured acoustic waveforms, audio signatures, or other data corresponding to a wakeword.

Thus, the wakeword detection component 620 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 620 may be built on deep neural network (DNN)/recursive neural network (RNN) structures directly, without HMM being involved. Such an architecture may estimate the posteriors of wakewords with context data, either by stacking frames within a context window for DNN, or using an RNN. Follow-on posterior threshold tuning or smoothing is applied for decision making. Other techniques for wakeword detection, such as those known in the art, may also be used.

Once the wakeword is detected by the wakeword detection component 620 and/or input is detected by an input detector, the user device 410 may "wake" and begin transmitting audio data 611, representing the audio 610, to the system component(s) 420. The audio data 611 may include data corresponding to the wakeword; in other embodiments, the portion of the audio corresponding to the wakeword is removed by the user device 410 prior to sending the audio data 611 to the system component(s) 420. In the case of touch input detection or gesture-based input detection, the audio data may not include a wakeword.

In some implementations, the system 100 may include more than one system component(s). The system component(s) 420 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 620 may result in sending audio data to system component(s) 420*a* for processing while detection of the wakeword "Computer" by the wakeword detector may result in sending audio data to system component(s) 420*b* for processing. The system may have a separate wakeword and system for different skills/systems (e.g., "Castle Adventure" for a game play skill/system component(s) 420*c*) and/or such skills/systems may be coordinated by one or more skill component(s) 454 of one or more system component(s) 420.

The user device 410/system component(s) 420 may also include a system directed input detector 685. The system directed input detector 685 may be configured to determine whether an input to the system (for example speech, a gesture, etc.) is directed to the system or not directed to the system (for example directed to another user, etc.). The system directed input detector 685 may work in conjunction with the wakeword detection component 620. If the system directed input detector 685 determines an input is directed to the system, the user device 410 may "wake" and begin sending captured data for further processing. If data is being processed the user device 410 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 685 determines an input is not directed to the system (such as a speech or gesture directed to another user) the user device 410 may discard the data and take no further action for processing purposes. In this way the system 100 may prevent processing of data not directed to the system, thus protecting user privacy. As an indicator to the user, however, the system may output an audio, visual, or other indicator when the system directed input detector 685 is determining whether an input is potentially device directed. For example, the system may output an orange indicator while considering an input and may output a green indicator if a system directed input is detected. Other such configurations are possible.

Upon receipt by the system component(s) 420, the audio data 611 may be sent to an orchestrator component 630 and/or the language model orchestrator component 430. The orchestrator component 630 may include memory and logic that enables the orchestrator component 630 to transmit various pieces and forms of data to various components of the system, as well as perform other operations as described herein. In some embodiments, the orchestrator component 630 may optionally be included in the system component(s) 420. In embodiments where the orchestrator component 630 is not included in the system component(s) 420, the audio data 611 may be sent directly to the language model orchestrator component 430. Further, in such embodiments, each of the components of the system component(s) 420 may be configured to interact with the language model orchestrator component 430, the action plan execution component 425, the API provider component, and/or other component(s).

In some embodiments, the system component(s) 420 may include an arbitrator component 682, which may be configured to determine whether the orchestrator component 630 and/or the language model orchestrator component 430 are to process with respect to user input data. In some embodiments, the language model orchestrator component 430 may be selected to process with respect to the audio data 611 only if the user 405 associated with the audio data 611 (or the user device 410 that captured the audio 610) has previously indicated that the language model orchestrator component 430 may be selected to process with respect to user inputs received from the user 405.

In some embodiments, the arbitrator component 682 may determine the orchestrator component 630 and/or the language model orchestrator component 430 are to process with respect to the audio data 611 based on metadata associated with the audio data 611. For example, the arbitrator component 682 may be a classifier configured to process a natural language representation of the audio data 611 (e.g., output by the ASR component 650) and classify the corresponding user input as to be processed by the orchestrator component 630 and/or the language model orchestrator component 430. For further example, the arbitrator component 682 may determine whether the device from which the audio data 611 is received is associated with an indicator representing the audio data 611 is to be processed by the orchestrator component 630 and/or the language model orchestrator component 430. As an even further example, the arbitrator component 682 may determine whether the user (e.g., determined using data output from the user recognition component 695) from which the audio data 611 is received is associated with a user profile including an indicator representing the audio data 611 is to be processed by the orchestrator component 630 and/or the language model orchestrator component 430. As another example, the arbitrator component 682 may determine whether the audio data 611 (or the output of the ASR component 650) corresponds to a request representing that the audio data 611 is to be processed by the orchestrator component 630 and/or the language model orchestrator component 430 (e.g., a request including "let's chat" may represent that the audio data 611 is to be processed by the language model orchestrator component 430).

In some embodiments, if the arbitrator component 682 is unsure (e.g., a confidence score corresponding to whether the orchestrator component 630 and/or the language model orchestrator component 430 is to process is below a threshold), then the arbitrator component 682 may send the audio data 611 to both of the orchestrator component 630 and the language model orchestrator component 430. In such embodiments, the orchestrator component 630 and/or the language model orchestrator component 430 may include further logic for determining further confidence scores during processing representing whether the orchestrator component 630 and/or the language model orchestrator component 430 should continue processing, as is discussed further herein below.

The arbitrator component 682 may send the audio data 611 to an ASR component 650. In some embodiments, the component selected to process the audio data 611 (e.g., the orchestrator component 630 and/or the language model orchestrator component 430) may send the audio data 611 to the ASR component 650. The ASR component 650 may transcribe the audio data 611 into text data. The text data output by the ASR component 650 represents one or more than one (e.g., in the form of an N-best list) ASR hypotheses representing speech represented in the audio data 611. The ASR component 650 interprets the speech in the audio data 611 based on a similarity between the audio data 611 and pre-established language models. For example, the ASR component 650 may compare the audio data 611 with models for sounds (e.g., acoustic units such as phonemes, senons, phones, etc.) and sequences of sounds to identify words that match the sequence of sounds of the speech represented in the audio data 611. The ASR component 650 sends the text data generated thereby to the arbitrator component 682, the orchestrator component 630, and/or the language model orchestrator component 430. In instances where the text data is sent to the arbitrator component 682, the arbitrator component 682 may send the text data to the component selected to process the audio data 611 (e.g., the orchestrator component 630 and/or the language model orchestrator component 430). The text data sent from the ASR component 650 to the arbitrator component 682, the orchestrator component 630, and/or the language model orchestrator component 430 may include a single top-scoring ASR hypothesis or may include an N-best list including multiple top-scoring ASR hypotheses. An N-best list may additionally include a respective score associated with each ASR hypothesis represented therein.

In some embodiments, the orchestrator component 630 may cause a NLU component (not shown) to perform processing with respect to the ASR data generated by the ASR component 650. The NLU component may attempt to make a semantic interpretation of the phrase(s) or statement(s) represented in the ASR data input therein by determining one or more meanings associated with the phrase(s) or statement(s) represented in the text data. The NLU component may determine an intent representing an action that a user desires be performed and may determine information that allows a device (e.g., the device 410, the system component(s) 420, a skill/app component 454, a skill system component(s) 625, etc.) to execute the intent. For example, if the ASR data corresponds to "play the 5th Symphony by Beethoven," the NLU component may determine an intent that the system output music and may identify "Beethoven" as an artist/composer and "5th Symphony" as the piece of music to be played. For further example, if the ASR data corresponds to "what is the weather," the NLU component may determine an intent that the system output weather information associated with a geographic location of the device 410. In another example, if the ASR data corresponds to "turn off the lights," the NLU component may determine an intent that the system turn off lights associated with the device 410 or the user 405. However, if the NLU component is unable to resolve the entity—for example, because the entity is referred to by anaphora such as "this song" or "my next appointment"—the system can send a decode request to another speech processing system for information regarding the entity mention and/or other context related to the utterance. The natural language processing system may augment, correct, or base results data upon the ASR data as well as any data received from the system.

The NLU component may return NLU results data (which may include tagged text data, indicators of intent, etc.) back to the orchestrator component 630. The orchestrator component 630 may forward the NLU results data to a skill component(s) 454. If the NLU results data includes a single NLU hypothesis, the NLU component and the orchestrator component 630 may direct the NLU results data to the skill component(s) 454 associated with the NLU hypothesis. If the NLU results data includes an N-best list of NLU hypotheses, the NLU component and the orchestrator component 630 may direct the top scoring NLU hypothesis to a skill component(s) 454 associated with the top scoring NLU hypothesis. The system may also include a post-NLU ranker which may incorporate other information to rank potential interpretations determined by the NLU component.

In some embodiments, after determining that the orchestrator component 630 and/or the language model orchestrator component 430 should process with respect to the user input, the arbitrator component 682 may be configured to periodically determine whether the orchestrator component 630 and/or the language model orchestrator component 430 should continue processing with respect to the user input. For example, after a particular point in the processing of the orchestrator component 630 (e.g., after performing NLU, prior to determining a skill component 454 to process with respect to the user input, prior to performing an action responsive to the user input, etc.) and/or the language model orchestrator component 430 (e.g., after selecting a task to be completed, after receiving the action response data from the one or more components, after completing a task, prior to performing an action responsive to the user input, etc.) the orchestrator component 630 and/or the language model orchestrator component 430 may query the arbitrator component 682 has determined that the orchestrator component 630 and/or the language model orchestrator component 430 should halt processing with respect to the user input. As discussed above, the system 100 may be configured to stream portions of data associated with processing with respect to a user input to the one or more components such that the one or more components may begin performing their configured processing with respect to that data as soon as it is available to the one or more components. As such, the arbitrator component 682 may cause the orchestrator component 630 and/or the language model orchestrator component 430 to begin processing with respect to a user input as soon as a portion of data associated with the user input is available (e.g., the ASR data, context data, output of the user recognition component 695. Thereafter, once the arbitrator component 682 has enough data to perform the processing described herein above to determine whether the orchestrator component 630 and/or the language model orchestrator component 430 is to process with respect to the user input, the arbitrator component 682 may inform the corresponding component (e.g., the orchestrator component 630 and/or the language model orchestrator component 430) to continue/halt processing with respect to the user input at one of the logical checkpoints in the processing of the orchestrator component 630 and/or the language model orchestrator component 430.

A skill system component(s) 625 may communicate with a skill/app component(s) 454 within the system component(s) 420 directly with the orchestrator component 630 and/or the action plan execution component 425, or with other components. A skill system component(s) 625 may be configured to perform one or more actions. An ability to perform such action(s) may sometimes be referred to as a "skill." That is, a skill may enable a skill system component(s) 625 to execute specific functionality in order to provide data or perform some other action requested by a user. For example, a weather service skill may enable a skill system component(s) 625 to provide weather information to the system component(s) 420, a car service skill may enable a skill system component(s) 625 to book a trip with respect to a taxi or ride sharing service, an order pizza skill may enable a skill system component(s) 625 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 420 may be configured with a skill/app component 454 dedicated to interacting with the skill system component(s) 625. Unless expressly stated otherwise, reference to a skill, skill device, or skill component may include a skill/app component 454 operated by the system component(s) 420 and/or skill/app operated by the skill system component(s) 625. Moreover, the functionality described herein as a skill or skill may be referred to using many different terms, such as an action, bot, app, or the like. The skill component 454 and or skill system component(s) 625 may return output data to the orchestrator component 630.

The system component(s) includes a SSG component 456. The SSG component 456 may generate audio data (e.g., synthesized speech) from text data, text embeddings, text tokens, audio tokens, audio embeddings, etc., using one or more different methods. Data input to the SSG component 456 may come from a skill/app component 454, the orchestrator component 630, the action plan execution component 425, or another component of the system. In one method of synthesis called unit selection, the SSG component 456 matches data against a database of recorded speech. The SSG component 456 selects matching units of recorded speech and concatenates the units together to form audio data. In another method of synthesis called parametric synthesis, the SSG component 456 varies parameters such as frequency, volume, and noise to create audio data including an artificial speech waveform. Parametric synthesis uses a computerized voice generator, sometimes called a vocoder.

The user device 410 may include still image and/or video capture components such as a camera or cameras to capture one or more images. The user device 410 may include circuitry for digitizing the images and/or video for transmission to the system component(s) 420 as image data. The user device 410 may further include circuitry for voice command-based control of the camera, allowing a user 405 to request capture of image or video data. The user device 410 may process the commands locally or send audio data 611 representing the commands to the system component(s) 420 for processing, after which the system component(s) 420 may return output data that can cause the user device 410 to engage its camera.

The system component(s) 420/the user device 410 may include a user recognition component 695 that recognizes one or more users using a variety of data. However, the disclosure is not limited thereto, and the user device 410 may include the user recognition component 695 instead of and/or in addition to the system component(s) 420 without departing from the disclosure.

The user recognition component 695 may take as input the audio data 611 and/or text data output by the ASR component 650. The user recognition component 695 may perform user recognition by comparing audio characteristics in the audio data 611 to stored audio characteristics of users. The user recognition component 695 may also perform user recognition by comparing biometric data (e.g., fingerprint data, iris data, etc.), received by the system in correlation with the present user input, to stored biometric data of users assuming user permission and previous authorization. The user recognition component 695 may further perform user recognition by comparing image data (e.g., including a representation of at least a feature of a user), received by the system in correlation with the present user input, with stored image data including representations of features of different users. The user recognition component 695 may perform additional user recognition processes, including those known in the art.

The user recognition component 695 determines scores indicating whether user input originated from a particular user. For example, a first score may indicate a likelihood that the user input originated from a first user, a second score may indicate a likelihood that the user input originated from a second user, etc. The user recognition component 695 also determines an overall confidence regarding the accuracy of user recognition operations.

Output of the user recognition component 695 may include a single user identifier corresponding to the most likely user that originated the user input. Alternatively, output of the user recognition component 695 may include an N-best list of user identifiers with respective scores indicating likelihoods of respective users originating the user input. The output of the user recognition component 695 may be used to inform processing of the arbitrator component 682, the orchestrator component 630, and/or the language model orchestrator component 430 as well as processing performed by other components of the system.

The system component(s) 420/user device 410 may include a presence detection component that determines the presence and/or location of one or more users using a variety of data.

The system 100 (either on user device 410, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 670 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more internet protocol (IP) addresses, medium access control (MAC) addresses, and/or device identifiers, such as a serial number, of each additional electronic device associated with the identified user account. When a user logs into to an application installed on a user device 410, the user profile (associated with the presented login information) may be updated to include information about the user device 410, for example with an indication that the device is currently in use. Each user profile may include identifiers of components (e.g., responding component(s) 460 such as skills/apps, language model-based agents, knowledge bases, components for a particular domain, etc.) that the user has enabled. When a user enables a component, the user is providing the system component(s) with permission to allow the component to execute with respect to the user's inputs. If a user does not enable a component, the system component(s) may not invoke that component to execute with respect to the user's inputs.

The profile storage 670 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 670 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 6 may be illustrated as part of system component(s) 420, user device 410, or otherwise, the components may be arranged in other device(s) (such as in user device 410 if illustrated in system component(s) 420 or vice-versa, or in other device(s) altogether) without departing from the disclosure.

In at least some embodiments, the system component(s) 420 may receive the audio data 611 from the user device 410, to recognize speech corresponding to a spoken input in the received audio data 611, and to perform functions in response to the recognized speech. In at least some embodiments, these functions involve sending directives (e.g., commands), from the system component(s) to the user device 410 (and/or other user devices 410) to cause the user device 410 to perform an action, such as output an audible response to the spoken input via a loudspeaker(s), and/or control secondary devices in the environment by sending a control command to the secondary devices.

Thus, when the user device 410 is able to communicate with the system component(s) over the network(s) 199, some or all of the functions capable of being performed by the system component(s) may be performed by sending one or more directives over the network(s) 199 to the user device 410, which, in turn, may process the directive(s) and perform one or more corresponding actions. For example, the system component(s), using a remote directive that is included in response data (e.g., a remote response), may direct the user device 410 to output an audible response (e.g., using SSG processing performed by an on-device SSG component) to a user's question via a loudspeaker(s) of (or otherwise associated with) the user device 410, to output content (e.g., music) via the loudspeaker(s) of (or otherwise associated with) the user device 410, to display content on a display of (or otherwise associated with) the user device 410, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 405 as part of a shopping function, establishing a communication session (e.g., a video call) between the user 405 and another user, and so on.

In at least some embodiments, the user device 410, may send the audio data 611 to the wakeword detection component 620. If the wakeword detection component 620 detects a wakeword in the audio data 611, the wakeword detection component 620 may send an indication of such detection to the user device 410. In response to receiving the indication, the audio data 611 may be sent to the system component(s) 420 and/or the ASR component of the user device 410. The wakeword detection component 620 may also send an indication, to the user device 410, representing a wakeword was not detected. In response to receiving such an indication, the audio data 611 may not be sent to the system component(s) 420, and the user device 410 may prevent the ASR component of the user device 410 from further processing the audio data 611. In this situation, the audio data 611 can be discarded.

In some embodiments, the user device 410 may include some or all of the components illustrated in FIG. 6 and/or discussed herein above with respect to the system component(s) 420. In other embodiments, the components illustrated in FIG. 6 and/or discussed herein with respect to the system component(s) 420 may be distributed across the user device 410 and the system component(s) 420.

In at least some embodiments, the components of the user device 410 (e.g., on-device components) may not have the same capabilities as the components of the system component(s) 420. For example, on-device components may be configured to generate a response to only a subset of the natural language user inputs that may be handled by the system component(s) 420. For example, such subset of natural language user inputs may correspond to local-type natural language user inputs, such as those controlling devices or components associated with a user's home. In such circumstances the on-device components may be able to more quickly interpret and respond to a local-type natural language user input, for example, than processing that involves the system component(s). If the user device 410 attempts to process a natural language user input for which the on-device components are not necessarily best suited, the language processing results determined by the user device 410 may indicate a low confidence or other metric indicating that the processing by the user device 410 may not be as accurate as the processing done by the system component(s) 420.

In some embodiments, the system component(s) 420 and the user device 410 may process as described herein to generate responses to the user input corresponding to the audio data 611. The system component(s) 420 may send the response to the user device 410 and the user device 410 may determine whether to output the response generated by the system component(s) 420 or the response generated by the user device 410. In some embodiments, the system component(s) 420 may be configured to perform a portion of the processing described herein, such as a portion of processing not performable by the user device 410 and send the result of such processing to the user device 410. The user device 410 may be configured to determine whether to use the result to complete processing to generate the response to the user device 410.

In at least some embodiments, the user device 410 may include, or be configured to use, one or more skill/app components that may operate similarly to the skill/app component(s) 454. The skill/app component(s) on the user device 410 may correspond to one or more domains that are used in order to determine how to act on a spoken input in a particular way, such as by outputting a directive that corresponds to the determined intent, and which can be processed to implement the desired operation. The skill component(s) installed on the user device 410 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally, or alternatively, the user device 410 may be in communication with one or more skill system component(s) 625. For example, a skill system component(s) 625 may be located in a remote environment (e.g., separate location) such that the user device 410 may only communicate with the skill system component(s) 625 via the network(s) 199. However, the disclosure is not limited thereto. For example, in at least some embodiments, a skill system component(s) 625 may be configured in a local environment (e.g., home server and/or the like) such that the user device 410 may communicate with the skill system component(s) 625 via a private network, such as a local area network (LAN).

Figure 7:
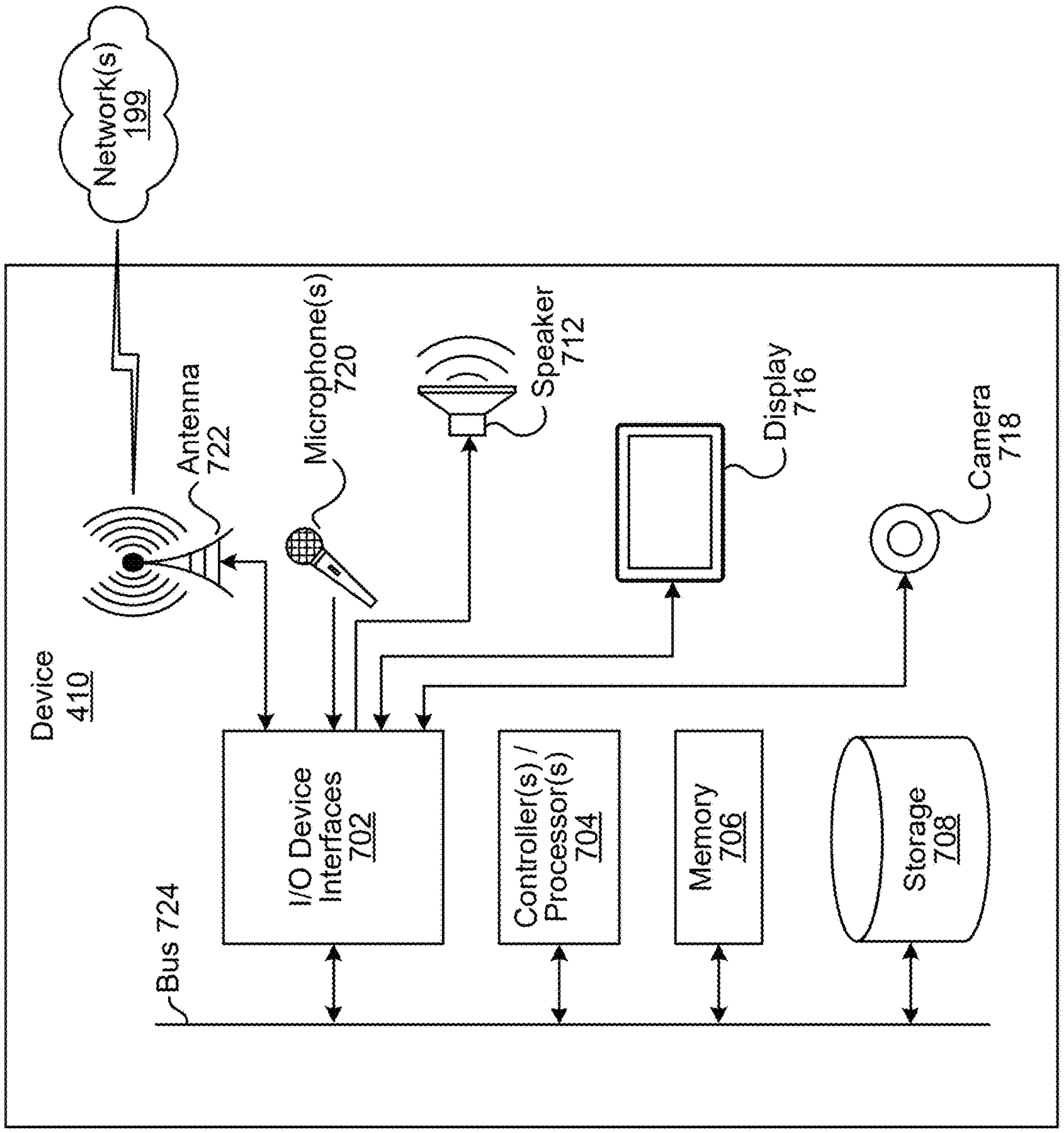
FIG. 7 is a block diagram conceptually illustrating example components of a device, according to embodiments of the present disclosure.
Figure 8:
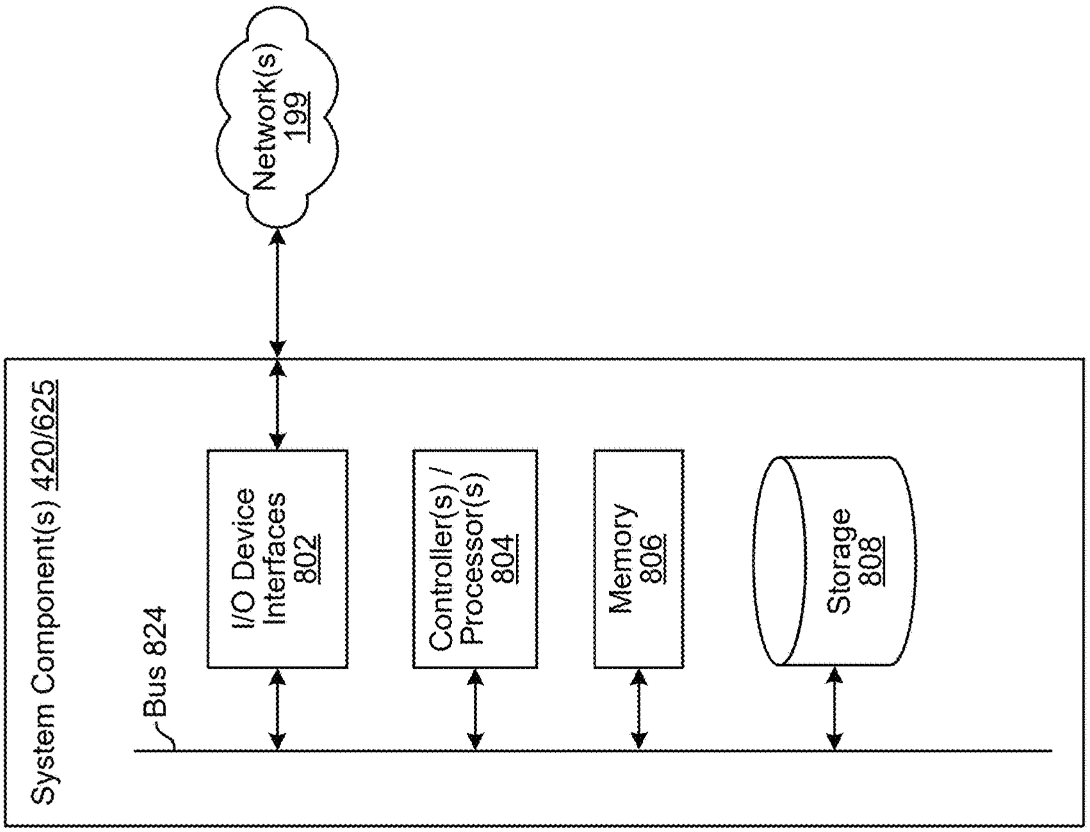
FIG. 8 is a block diagram conceptually illustrating example components of a system, according to embodiments of the present disclosure.

FIG. 7 is a block diagram conceptually illustrating a user device 410 that may be used with the system. FIG. 8 is a block diagram conceptually illustrating example components of a remote device, such as the system component(s) 420, which may assist with ASR processing, NLU processing, language model processing, etc., and a skill system component(s) 625. System component(s) (420/625) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

In some embodiments, some of the system components 420 (e.g., the language model orchestrator 430, the language model(s) 445, the speculative decoding component 220, etc.) may be implemented using the hardware system 105 described in relation to FIG. 1. In such embodiments, the multiprocessor(s) 110 may be an example of the processor(s) 804, the cache 115 and the global memory 120 may be examples of the memory 806 and/or the storage 808.

While the user device 410 may operate locally to a user (e.g., within a same environment so the device may receive inputs and playback outputs for the user) the server/system component(s) may be located remotely from the user device 410 as its operations may not require proximity to the user. The server/system component(s) may be located in an entirely different location from the user device 410 (for example, as part of a cloud computing system or the like) or may be located in a same environment as the user device 410 but physically separated therefrom (for example a home server or similar device that resides in a user's home or business but perhaps in a closet, basement, attic, or the like). The system component(s) 420 may also be a version of a user device 410 that includes different (e.g., more) processing capabilities than other user device(s) 410 in a home/office. One benefit to the server/system component(s) being in a user's home/business is that data used to process a command/return a response may be kept within the user's home, thus reducing potential privacy concerns.

Multiple system components (420/625) may be included in the overall system 100 of the present disclosure, such as one or more natural language processing system component(s) 420 for performing ASR processing, one or more natural language processing system component(s) 420 for performing NLU processing, one or more skill system component(s) 625, etc. In operation, each of these systems may include computer-readable and computer-executable instructions that reside on the respective device (420/625), as will be discussed further below.

Each of these devices (410/420/625) may include one or more controllers/processors (704/804), which may each include a central processing unit (CPU) for processing data and computer-readable instructions, and a memory (706/806) for storing data and instructions of the respective device. The memories (706/806) may individually include volatile random-access memory (RAM), non-volatile read only memory (ROM), non-volatile magnetoresistive memory (MRAM), and/or other types of memory. Each device (410/420/625) may also include a data storage component (708/808) for storing data and controller/processor-executable instructions. Each data storage component (708/808) may individually include one or more non-volatile storage types such as magnetic storage, optical storage, solid-state storage, etc. Each device (410/420/625) may also be connected to removable or external non-volatile memory and/or storage (such as a removable memory card, memory key drive, networked storage, etc.) through respective input/output device interfaces (702/802).

Computer instructions for operating each device (410/420/625) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (410/420/625) includes input/output device interfaces (702/802). A variety of components may be connected through the input/output device interfaces (702/802), as will be discussed further below. Additionally, each device (410/420/625) may include an address/data bus (724/824) for conveying data among components of the respective device. Each component within a device (410/420/625) may also be directly connected to other components in addition to (or instead of) being connected to other components across the bus (724/824).

Referring to FIG. 7, the user device 410 may include input/output device interfaces 702 that connect to a variety of components such as an audio output component such as a speaker 712, a wired headset or a wireless headset (not illustrated), or other component capable of outputting audio. The user device 410 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 410 may additionally include a display 716 for displaying content. The user device 410 may further include a camera 718.

Via antenna(s) 722, the input/output device interfaces 702 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the user device(s) 410, the system component(s) 420, or a skill system component(s) 625 may include their own dedicated processors, memory, and/or storage. Alternatively, one or more of the components of the user device(s) 410, the system component(s) 420, or a skill system component(s) 625 may utilize the I/O interfaces (702/802), processor(s) (704/804), memory (706/806), and/or storage (708/808) of the user device(s) 410, the system component(s) 420, or the skill system component(s) 625, respectively. Thus, the ASR component 650 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 410, the system component(s) 420, and a skill system component(s) 625, as described herein, are illustrative, and may be located as a stand-alone device or may be included, in whole or in part, as a component of a larger device or system. As can be appreciated, a number of components may exist either as a system component(s) and/or on user device 410. Unless expressly noted otherwise, the system version of such components may operate similarly to the user device version of such components and thus the description of one version (e.g., the system version or the local user device version) applies to the description of the other version (e.g., the local user device version or system version) and vice-versa.

Figure 9:
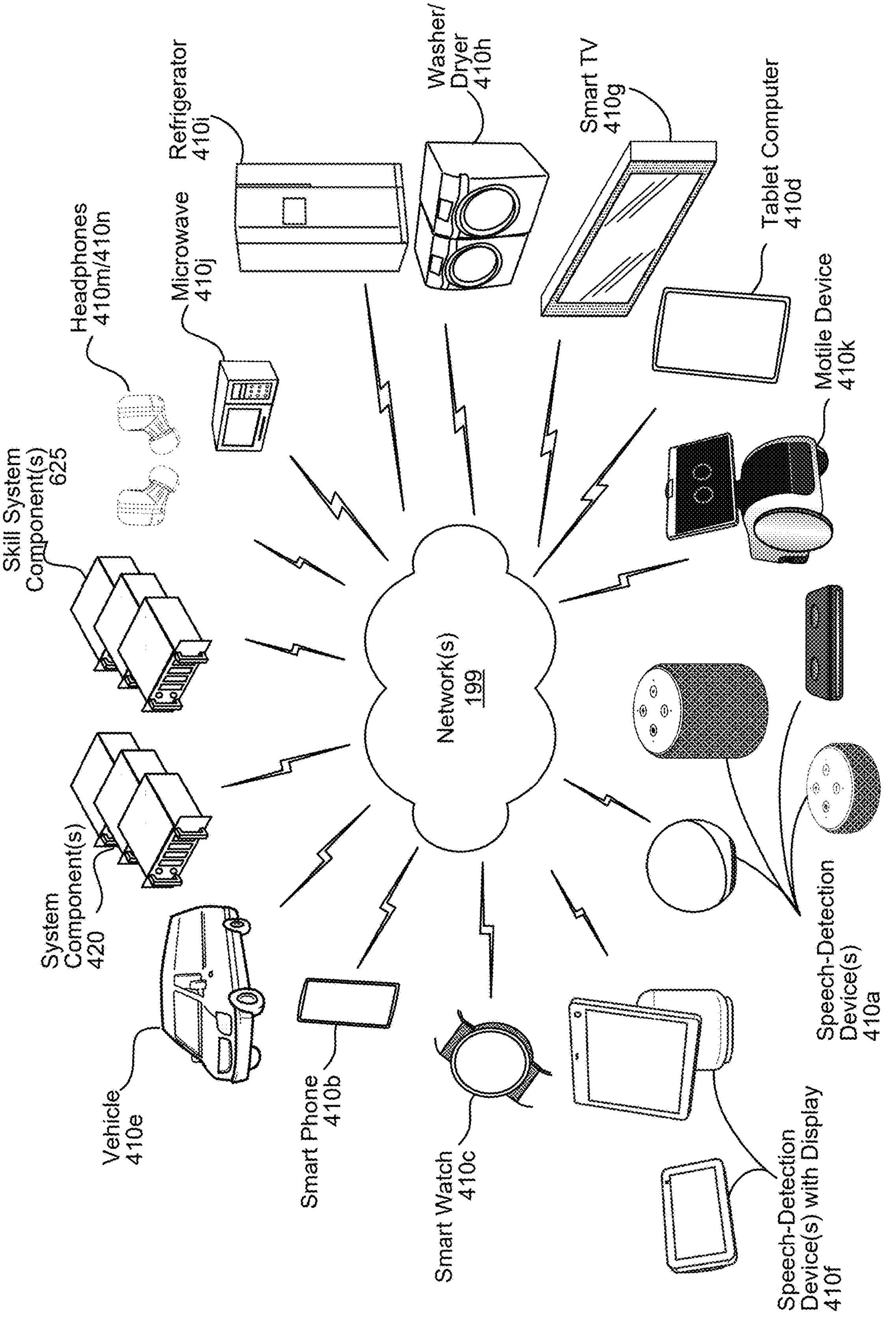
FIG. 9 illustrates an example of a network for use with the overall system, according to embodiments of the present disclosure.

As illustrated in FIG. 9, multiple devices (410*a*-410*n*, 420, 625) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection user device 410*a*, a smart phone 410*b*, a smart watch 410*c*, a tablet computer 410*d*, a vehicle 410*e*, a speech-detection device with display 410*f*, a display/smart television 410*g*, a washer/dryer 410*h*, a refrigerator 410*i*, a microwave 410*j*, autonomously motile user device 410*k* (e.g., a robot), headphones 410*m*/410*n* (e.g., wireless ear-buds, wireless headphones), etc., may be connected to the network(s) 199 through a wireless service provider, over a Wi-Fi or cellular network connection, or the like. Other devices are included as network-connected support devices, such as the system component(s) 420, the skill system component(s) 625, and/or others. The support devices may connect to the network(s) 199 through a wired connection or wireless connection. Networked devices may capture audio using one-or-more built-in or connected microphones or other audio capture devices, with processing performed by components of the same device or another device connected via the network(s) 199, such as the system component(s) 420.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

As used herein and in the appended claims, the term "computer-readable media" refers to one or more mediums or devices that store or transmit information in a format that a computer system accesses. Computer-readable media encompasses both storage media and transmission media. Storage media includes volatile and non-volatile memory devices such as RAM devices, ROM devices, secondary storage devices, register memory devices, memory controller devices, graphics memory devices, and the like. Transmission media includes wired and wireless physical pathways that carry communication signals such as twisted pair cable, coaxial cable, fiber optic cable, radio waves, microwaves, infrared, visible light communication, and the like.

As used herein and in the appended claims, the term "non-transitory computer-readable media" encompasses computer-readable media as just defined but excludes transitory, propagating signals. Data stored on non-transitory computer-readable media isn't just momentarily present and fleeting but has some degree of persistence. For example, instructions stored in a hard drive, a SSD, an optical disk, a flash drive, or other storage media are stored on non-transitory computer-readable media. Conversely, data carried by a transient electrical or electromagnetic signal or wave is not stored in non-transitory computer-readable media when so carried.

As used herein and in the appended claims, unless otherwise clear in context, the terms "comprising," "having," "containing," "including," "encompassing," "in response to," "based on," and the like are intended to be open-ended in that an element or elements following such a term is not meant to be an exhaustive listing of elements or meant to be limited to only the listed element or elements.

Unless otherwise clear in context, relational terms such as "first" and "second" are used herein and in the appended claims to differentiate one thing from another without limiting those things to a particular order or relationship. For example, unless otherwise clear in context, a "first device" could be termed a "second device." The first and second devices are both devices, but not the same device.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth.

Unless otherwise clear in context, the indefinite articles "a" and "an" are used herein and in the appended claims to mean "one or more" or "at least one." For example, unless otherwise clear in context, "in an embodiment" means in at least one embodiment, but not necessarily more than one embodiment. Accordingly, unless otherwise clear in context, phrases such as "a device configured to" are intended to include one or more recited devices. Such one or more recited devices, unless otherwise clear in context, are collectively configured to carry out the stated recitations. For example, "a processor configured to carry out recitations A, B and C" encompasses both (a) a single processor configured to carry out recitations A, B, and C and (b) a first processor configured to carry out recitation A working in conjunction with a second processor configured to carry out recitations B and C.

Unless otherwise clear in context, the terms "set," and "collection" should generally be interpreted to include one or more described items throughout this application. Accordingly, unless otherwise clear in context, phrases such as "a set of devices configured to" or "a collection of devices configured to" are intended to include one or more recited devices. Such one or more recited devices, unless otherwise clear in context, are collectively configured to carry out the stated recitations. For example, "a set of servers configured to carry out recitations A, B and C" encompasses both (a) a single server configured to carry out recitations A, B, and C and (b) a first server configured to carry out recitations A and B working in conjunction with a second server configured to carry out recitation C.

As used herein, unless otherwise clear in context, the term "or" is open-ended and encompasses all possible combinations, except where infeasible. For example, if it is stated that a component includes A or B, then, unless infeasible or otherwise clear in context, the component includes at least A, or at least B, or at least A and B. As a second example, if it is stated that a component includes A, B, or C then, unless infeasible or otherwise clear in context, the component includes at least A, or at least B, or at least C, or at least A and B, or at least A and C, or at least B and C, or at least A and B and C.

Unless the context clearly indicates otherwise, the relational term "in response to" or "responsive to" is used in this description and in the appended claims in an open-ended fashion to describe a stated action or behavior that is done as a reaction or reply to a stated stimulus without requiring or foreclosing additional unstated stimuli that affect the relationship between the stated action or behavior and the stated stimulus.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Further, the phrase "based on" is intended to mean "based at least in part on" unless specifically stated otherwise.

What is claimed is:

1. A computer-implemented method comprising:

receiving a batch size representing a number of inputs to be processed by a hardware system including one or more processors and at least one memory;

determining a user input length to be processed using a generative model;

using the hardware system, determining a compute budget corresponding to the generative model, the batch size and the user input length, wherein the compute budget represents a maximum number of tokens to be verified during speculative decoding;

receiving a batch of natural language user inputs to be processed using the hardware system, the batch including a first natural language input and a second natural language input;

determining the batch corresponds to the batch size;

determining that the first natural language input and the second natural language input each correspond to the user input length;

processing, using the hardware system and a draft generative model, the first natural language input to determine first speculative tokens;

based on the batch corresponding to the batch size and the first natural language input and the second natural language input each corresponding to the user input length, using the compute budget to determine:

a first number of tokens to be verified when processing the first natural language input; and a second number of tokens to be verified when processing the second natural language input, wherein a sum of the first number of tokens and the second number of tokens equals to the compute budget;

selecting second speculative tokens from the first speculative tokens, wherein the second speculative tokens corresponds to the first number of tokens;

processing, using the hardware system and the generative model, at least the second speculative tokens to determine a first response to the first natural language input; and sending the first response to a system component for further processing.

2. The computer-implemented method of claim 1, further comprising:

generating, using the hardware system and the draft generative model, a confidence score for the first speculative tokens, the first speculative tokens determined during a first timestep;

based at least in part on the confidence score and the compute budget, determining a third number of tokens to be verified during a second timestep occurring after the first timestep;

determining, using the hardware system and the draft generative model, third speculative tokens during the second timestep;

determining, from the third speculative tokens, fourth speculative tokens corresponding to the second number of tokens; and processing, using the hardware system and the generative model, the fourth speculative tokens to determine the first response.

3. The computer-implemented method of claim 1, further comprising:

processing, using the hardware system and the draft generative model, the second natural language input to determine third speculative tokens;

determining, from the third speculative tokens, fourth speculative tokens corresponding to the second number of tokens; and processing, using the hardware system and the generative model, the fourth speculative tokens to determine a second response to the second natural language input, wherein processing the second speculative tokens is performed substantially in parallel with processing of the first speculative tokens.

4. The computer-implemented method of claim 1, further comprising:

receiving a plurality of sample inputs corresponding to the batch size and the user input length;

performing, using the hardware system, speculative decoding with respect to the plurality of sample inputs;

based on performing speculative decoding, determining a first time taken by the generative model to verify the maximum number of tokens;

determining a second time taken by the generative model to perform a decoding step to generate one token; and determining the compute budget based on a ratio of the first time to the second time.

5. A computer-implemented method comprising:

determining, using a hardware system, a compute budget representing a maximum number of tokens to be verified when performing speculative decoding with respect to a batch of inputs in parallel, wherein the compute budget is based on a batch size and an input length;

receiving a batch of natural language user inputs to be processed using the hardware system, the batch including at least first input data;

processing, using the hardware system and a first generative model, the first input data to determine first speculative tokens;

determining, based at least in part on the compute budget, a first number of tokens to be verified during speculative decoding processing of the first input data, wherein the compute budget is used to assign a number of tokens to be verified during speculative decoding processing of each of the natural language user inputs of the batch;

determining, from the first speculative tokens, second speculative tokens corresponding to the first number of tokens;

processing, using the hardware system and a second generative model, the second speculative tokens to determine a first response to the first input data; and sending the first response to a system component for further processing.

6. The computer-implemented method of claim 5, wherein the batch further includes second input data and the computer-implemented method further comprises:

determining that the batch corresponds to the batch size;

determining that the first input data and the second input data each correspond to the input length; and selecting the compute budget, from a set of compute budgets, based on the batch corresponding to the batch size and the first input data and the second input data each corresponding to the input length.

7. The computer-implemented method of claim 5, wherein the batch further includes second input data and the computer-implemented method further comprises:

determining, based at least in part on the compute budget, a second number of tokens to be verified during speculative decoding processing with respect to the second input data, wherein the first number of tokens and the second number of tokens combined satisfy the compute budget.

8. The computer-implemented method of claim 7, further comprising:

processing, using the hardware system and the first generative model, the second input data to determine third speculative tokens;

determining, from the third speculative tokens, fourth speculative tokens corresponding to the second number of tokens; and processing, using the hardware system and the second generative model, the fourth speculative tokens to determine a second response to the second input data, wherein processing the fourth speculative tokens is performed substantially in parallel with processing the second speculative tokens.

9. The computer-implemented method of claim 5, further comprising:

determining a first time taken by the second generative model to verify the maximum number tokens, wherein the second generative model is executed using the hardware system;

determining a second time taken by the second generative model to perform a decoding step to generate one token; and determining the compute budget based on a ratio of the first time to the second time.

10. The computer-implemented method of claim 5, further comprising:

determining the first number of tokens for a first timestep;

based at least in part on processing the first speculative tokens, determining a second number of tokens to be verified during a second timestep;

determining, using the hardware system and the first generative model, third speculative tokens corresponding to the second number of tokens; and processing, using the hardware system and the second generative model, the third speculative tokens to determine the first response.

11. The computer-implemented method of claim 5, further comprising:

determining, using the hardware system and the first generative model, a first tree data structure including the first speculative tokens; and determining a second tree data structure including the second speculative tokens, wherein the second tree data structure corresponds to a tree structure size corresponding to the first number of tokens.

12. The computer-implemented method of claim 5, further comprising:

determining first specifications corresponding to the hardware system;

determining second specifications corresponding to a second hardware system;

determining that the first specifications are similar to the second specifications; and using the compute budget to perform speculative decoding using the second hardware system.

13. A system comprising:

a hardware system including:

at least one processor; and at least one memory including instructions that, when executed by the at least one processor, cause the hardware system to:

determine a compute budget representing a maximum number of tokens to be verified when performing speculative decoding with respect to a batch of inputs in parallel, wherein the compute budget is based on a batch size and an input length;

receive a batch of natural language user inputs to be processed using the hardware system, the batch including at least first input data;

process, using the hardware system and a first generative model, the first input data to determine first speculative tokens;

determine, based at least in part on the compute budget, a first number of tokens to be verified during speculative decoding processing of the first input data, wherein the compute budget is used to assign a number of tokens to be verified during speculative decoding processing of each of the natural language user inputs of the batch;

determine, from the first speculative tokens, second speculative tokens corresponding to the first number of tokens;

process, using the hardware system and a second generative model, the second speculative tokens to determine a first response to the first input data; and send the first response to a system component for further processing.

14. The system of claim 13, wherein the batch further includes second input data, wherein the at least one memory includes further instructions that, when executed by the at least one processor, further cause the hardware system to:

determine that the batch corresponds to the batch size;

determine that the first input data and the second input data each correspond to the input length; and select the compute budget, from a set of compute budgets, based on the batch corresponding to the batch size and the first input data and the second input data each corresponding to the input length.

15. The system of claim 13, wherein the batch further includes second input data, wherein the at least one memory includes further instructions that, when executed by the at least one processor, further cause the hardware system to:

determine, based at least in part on the compute budget, a second number of tokens to be verified during speculative decoding processing with respect to the second input data, wherein the first number of tokens and the second number of tokens combined satisfy the compute budget.

16. The system of claim 15, wherein the at least one memory includes further instructions that, when executed by the at least one processor, further cause the hardware system to:

process, using the first generative model, the second input data to determine third speculative tokens;

determine, from the third speculative tokens, fourth speculative tokens corresponding to the second number of tokens; and process, using the second generative model, the fourth speculative tokens to determine a second response to the second input data, wherein processing the fourth speculative tokens is performed substantially in parallel with processing the second speculative tokens.

17. The system of claim 13, wherein the at least one memory includes further instructions that, when executed by the at least one processor, further cause the hardware system to:

determine a first time taken by the second generative model to verify the maximum number tokens, wherein the second generative model is executed using the hardware system;

determine a second time taken by the second generative model to perform a decoding step to generate one token; and determine the compute budget based on a ratio of the first time to the second time.

18. The system of claim 13, wherein the at least one memory includes further instructions that, when executed by the at least one processor, further cause the hardware system to:

determine the first number of tokens for a first timestep;

based at least in part on processing the first speculative tokens, determine a second number of tokens to be verified during a second timestep;

determine, using the first generative model, third speculative tokens corresponding to the second number of tokens; and process, using the second generative model, the third speculative tokens to determine the first response.

19. The system of claim 13, wherein the at least one memory includes further instructions that, when executed by the at least one processor, further cause the hardware system to:

determine, using the first generative model, a first tree data structure including the first speculative tokens; and determine a second tree data structure including the second speculative tokens, wherein the second tree data structure corresponds to a tree structure size corresponding to the first number of tokens.

20. The system of claim 13, further comprising:

a second hardware system including at least one second processor and at least one second memory including instructions that, when executed by the at least one second processor, cause the second hardware system to:

determine first specifications corresponding to the hardware system;

determine second specifications corresponding to the second hardware system;

determine that the first specifications are similar to the second specifications; and use the compute budget to perform speculative decoding.

* * * * *